US012279723B2

(12) United States Patent
Dobizl et al.

(10) Patent No.: US 12,279,723 B2
(45) Date of Patent: Apr. 22, 2025

(54) WIPE DISPENSER AND METHODS

(71) Applicant: ECOLAB USA INC., Saint Paul, MN (US)

(72) Inventors: Kenneth Thomas Dobizl, Mounds View, MN (US); Joseph Steven Bons, Lino Lakes, MN (US); Sarah Elise Johnson, Saint Paul, MN (US); Ariel Brier Chatman Kleczewski, St. Paul, MN (US)

(73) Assignee: ECOLAB USA INC., Saint Paul, MN (US)

( * ) Notice: Subject to any disclaimer, the term of this patent is extended or adjusted under 35 U.S.C. 154(b) by 0 days.

(21) Appl. No.: 17/550,106

(22) Filed: Dec. 14, 2021

(65) Prior Publication Data

US 2022/0183512 A1 Jun. 16, 2022

Related U.S. Application Data

(60) Provisional application No. 63/125,719, filed on Dec. 15, 2020.

(51) Int. Cl.
*A47K 10/32* (2006.01)
*B01F 23/40* (2022.01)
(Continued)

(52) U.S. Cl.
CPC .............. *A47K 10/32* (2013.01); *B01F 23/45* (2022.01); *B01F 23/49* (2022.01);
(Continued)

(58) Field of Classification Search
CPC ............ A47K 10/32; A47K 2010/3273; B01F 35/7176; B01F 23/49; B01F 35/221; B01F 23/45; B01F 2101/24; B65D 83/0805
(Continued)

(56) References Cited

U.S. PATENT DOCUMENTS 2,702,780 A 2/1955 Lerner
2,789,725 A * 4/1957 Carper ................ A47K 10/427 221/56

(Continued)

FOREIGN PATENT DOCUMENTS

AU 84845/91 A 4/1992
AU 200123155 A1 8/2001

(Continued)

OTHER PUBLICATIONS

International Search Report and Written Opinion for PCT/US2021/063357 mailed Apr. 7, 2022, 22pgs.

*Primary Examiner* — Rakesh Kumar
(74) *Attorney, Agent, or Firm* — Merchant & Gould P.C.

(57) ABSTRACT

A wipe dispenser for use in metering out consistent doses of a composition onto a disposable wipe includes a mixing and dispensing assembly. The assembly has a vessel holding a first liquid for the composition and a first pump to convey the first liquid. A bottle having a second pump to convey a second liquid of the composition is stored within the bottle. A funnel arrangement is in downstream communication with the first pump and second pump. The funnel arrangement includes a mixing chamber for mixing the first and second liquids and a dispensing funnel in communication with and downstream of the mixing chamber. A wipe can be pulled through the dispensing funnel and wetted with a mixture of the first liquid and second liquid from the mixing chamber. A push bar attached to the funnel arrangement can selectively apply the force to actuate the first pump and second pump.

16 Claims, 32 Drawing Sheets

(51) Int. Cl.
*B01F 23/45* (2022.01)
*B01F 35/221* (2022.01)
*B01F 35/71* (2022.01)
*B65D 83/08* (2006.01)
*B01F 101/24* (2022.01)

(52) U.S. Cl.
CPC ...... *B01F 35/2211* (2022.01); *B01F 35/7176* (2022.01); *B65D 83/0805* (2013.01); *A47K 2010/3273* (2013.01); *B01F 2101/24* (2022.01)

(58) Field of Classification Search
USPC ......... 206/233, 38, 449, 192, 321.7; 221/96, 221/102; 222/192, 321.9, 383.1, 129, 222/166, 183, 190
See application file for complete search history.

(56) References Cited

U.S. PATENT DOCUMENTS 3,189,228 A * 6/1965 Steinbart ............... A61F 15/001 222/215
3,776,773 A 12/1973 Taft
3,786,615 A 1/1974 Bauer
3,796,185 A 3/1974 Boone
3,947,134 A * 3/1976 Ogawa ................... A47K 10/32 219/214
3,980,203 A * 9/1976 Dearling ................ A47K 10/42 239/289
4,069,789 A * 1/1978 Fukagawa .......... B65H 35/0046 118/43
4,543,913 A * 10/1985 Wilkeson ............. A01K 13/003 401/28
4,598,664 A * 7/1986 Hamlin .................. A47K 10/32 118/325
4,667,846 A * 5/1987 Marceau ................ A47K 10/32 221/96
4,759,652 A * 7/1988 Ulrich .................... A45D 34/00 206/226
5,025,524 A 6/1991 Genovese, Jr.
5,252,332 A 10/1993 Goldstein
5,256,417 A 10/1993 Koltisko
5,312,021 A * 5/1994 Nelson ................... A47K 10/36 239/289
5,375,616 A 12/1994 Chen
5,439,104 A * 8/1995 Wolska-Klis ........ G02C 13/006 221/96
5,486,381 A 1/1996 Cleveland et al.
5,528,278 A 6/1996 Takizawa et al.
5,672,206 A 9/1997 Gorman
5,829,278 A 11/1998 Koo
5,830,546 A 11/1998 Ehret et al.
5,887,759 A * 3/1999 Ayigbe ................ B05B 11/1059 118/325
6,021,919 A * 2/2000 Kelly ..................... A61B 42/40 221/281
6,024,012 A 2/2000 Luzenberg, Jr.
6,090,215 A 7/2000 Cooper
6,311,833 B1 * 11/2001 Collier ................. A45C 11/005 206/229
6,314,791 B1 11/2001 Rapp et al.
6,321,937 B1 * 11/2001 DeSimone ......... A47K 10/3818 221/45
6,457,893 B1 10/2002 Hamilton
6,601,730 B2 8/2003 Chen
6,613,144 B1 * 9/2003 Loertscher ............. A47K 10/32 118/325
6,668,843 B2 12/2003 Chen
6,691,897 B2 2/2004 Ashe
6,752,344 B1 6/2004 Biagiotti
6,779,682 B2 8/2004 Chen
6,789,695 B1 * 9/2004 Gaudreau ............ A47K 10/424 221/102
6,883,787 B2 4/2005 Allen
6,903,307 B1 6/2005 McConnell et al.
7,149,417 B2 12/2006 Joshi et al.
7,320,418 B2 * 1/2008 Sassoon ................. G04C 23/44 222/402.1
7,370,754 B2 * 5/2008 Kushner ................... B08B 3/02 206/233
7,378,360 B2 5/2008 Clark et al.
7,497,351 B2 * 3/2009 Amundson .......... A47K 10/421 221/96
7,556,175 B2 7/2009 Simkins
7,588,168 B2 9/2009 Bagwell et al.
7,770,729 B2 8/2010 Warren et al.
7,811,530 B2 10/2010 Morrison
7,832,555 B2 11/2010 Flannery
7,856,941 B2 12/2010 Nelson et al.
7,887,760 B2 2/2011 Yamamoto et al.
7,987,756 B2 8/2011 Lewis et al.
8,197,830 B2 6/2012 Helfman et al.
8,232,237 B2 7/2012 McKechnie
8,252,142 B2 8/2012 Gane et al.
8,317,061 B2 11/2012 Vignot
8,474,651 B2 7/2013 Simkins
D687,650 S 8/2013 Wells et al.
8,551,409 B2 10/2013 Yamamoto et al.
8,564,431 B2 10/2013 Snodgrass
8,747,755 B2 6/2014 Larsson
8,853,143 B2 10/2014 Fellows
8,872,665 B2 10/2014 Snodgrass
9,095,243 B2 8/2015 Ray et al.
9,101,250 B2 8/2015 Ray
9,113,759 B2 8/2015 Ray et al.
9,271,616 B2 3/2016 Yaros
9,549,646 B2 1/2017 Ray et al.
9,824,569 B2 11/2017 Snodgrass
10,285,544 B2 5/2019 Perlas et al.
10,300,162 B2 5/2019 Joseph
10,478,022 B2 11/2019 Duarte et al.
10,542,854 B2 1/2020 Harris et al.
10,806,310 B2 10/2020 Mann et al.
10,849,470 B2 12/2020 Mann et al.
10,897,894 B2 1/2021 Tsai et al.
11,071,418 B2 7/2021 Harris et al.
11,547,251 B2 * 1/2023 McCarthy .......... A47K 10/3625
2002/0127937 A1 9/2002 Lange et al.
2004/0200410 A1 * 10/2004 Shadrach, III ..... A47K 10/3818 118/400
2006/0070990 A1 4/2006 McConnell et al.
2006/0173576 A1 * 8/2006 Goerg ................ A47K 10/3662 700/236
2006/0283873 A1 12/2006 Bostic
2008/0064278 A1 3/2008 Oaroche
2008/0257906 A1 * 10/2008 Orgna .................. A47K 5/1202 221/303
2009/0031952 A1 2/2009 Lazar
2009/0032553 A1 * 2/2009 Eddy ......................... A61L 9/14 222/183
2009/0084811 A1 * 4/2009 Nelson ................... A47K 10/32 221/282
2009/0090737 A1 * 4/2009 Franco ..................... A47K 5/12 221/96
2010/0032443 A1 * 2/2010 Mueller ................. A45D 34/04 221/34
2010/0112883 A1 5/2010 Giraud et al.
2010/0314485 A1 12/2010 Anderson
2012/0018445 A1 1/2012 Mendoza et al.
2012/0228149 A1 9/2012 Boal et al.
2013/0104599 A1 5/2013 Beldiman
2013/0214083 A1 8/2013 Yurczyk et al.
2015/0196173 A1 * 7/2015 Hoefte ................. A47K 5/1211 222/153.01
2015/0245747 A1 * 9/2015 Manfredonia ....... A47K 10/426 221/96
2018/0255981 A1 9/2018 Rospierski et al.
2018/0338649 A1 * 11/2018 Perlas ...................... A47K 5/12

(56) References Cited

U.S. PATENT DOCUMENTS

| | | | | |
|---|---|---|---|---|
| 2022/0183512 | A1 * | 6/2022 | Dobizl | B01F 23/49 |
| 2022/0346605 | A1 * | 11/2022 | Kramer | A47K 10/36 |

FOREIGN PATENT DOCUMENTS

| | | | | | |
|---|---|---|---|---|---|
| AU | 2011203043 | B2 | | 2/2012 | |
| AU | 2012201516 | A1 | | 4/2012 | |
| CA | 2 806 939 | A1 | | 8/2014 | |
| CN | 2481679 | Y | | 3/2002 | |
| CN | 1243475 | C | | 3/2006 | |
| CN | 1929769 | B | | 4/2011 | |
| CN | 101654870 | B | | 11/2011 | |
| CN | 101491245 | B | | 6/2012 | |
| CN | 202526047 | U | | 11/2012 | |
| CN | 204181539 | U | | 3/2015 | |
| CN | 204743964 | U | | 11/2015 | |
| CN | 103251343 | B | | 4/2016 | |
| CN | 205162938 | U | | 4/2016 | |
| DE | 2351894 | A1 | | 8/1974 | |
| DE | 52 764 | A1 | | 5/1977 | |
| DE | 35 330 | A1 | | 4/1987 | |
| DE | 44 438 | A1 | | 7/1989 | |
| DE | 00 920 | C2 | | 3/1999 | |
| DE | 102006036772 | A1 | * | 2/2008 | A47K 10/32 |
| DE | 2013 111 859 | B3 | | 6/2014 | |
| EP | 495 396 | A1 | | 7/1992 | |
| EP | 0550863 | A1 | * | 7/1993 | A47K 10/32 |
| EP | 648 523 | B1 | | 9/2008 | |
| EP | 165 142 | A1 | | 5/2017 | |
| FR | 2040768 | A5 | | 1/1971 | |
| FR | 2866796 | A1 | | 9/2005 | |
| GB | 2270299 | A | | 3/1994 | |
| GB | 2394219 | B | | 10/2004 | |
| GB | 2460761 | A | | 12/2009 | |
| GB | 2500282 | A | | 9/2013 | |
| IN | 238504 | B | | 2/2010 | |
| JP | 5-15469 | A | | 1/1993 | |
| JP | 10-33407 | A | | 2/1998 | |
| JP | 11-225902 | A | | 8/1999 | |
| JP | 2000-93345 | A | | 4/2000 | |
| JP | 2001-31154 | A | | 2/2001 | |
| JP | 2003-174989 | A | | 6/2003 | |
| JP | 2004-105431 | A | | 4/2004 | |
| JP | 3590954 | B1 | | 11/2004 | |
| JP | 2007-229423 | A | | 9/2007 | |
| JP | 4045560 | B2 | | 2/2008 | |
| JP | 4766786 | B2 | | 9/2011 | |
| JP | 5051932 | B2 | | 10/2012 | |
| JP | 3181584 | U | | 2/2013 | |
| JP | 2017-38551 | A | | 2/2017 | |
| KR | 2001-0098299 | A | | 11/2001 | |
| KR | 10-2006-0110434 | A | | 10/2006 | |
| KR | 10-2006-0130864 | A | | 12/2006 | |
| KR | 10-2011-0049480 | A | | 5/2011 | |
| KR | 10-2015-0084167 | A | | 7/2015 | |
| KR | 10-1539455 | B1 | | 8/2015 | |
| RU | 130223 | U1 | | 7/2013 | |
| WO | WO-2005087068 | A1 | * | 9/2005 | A47K 10/32 |
| WO | 2006/008461 | A1 | | 1/2006 | |
| WO | WO-2010072298 | A2 | * | 7/2010 | A47K 10/32 |
| WO | WO-8804150 | A1 | * | 1/2013 | A47K 10/32 |

* cited by examiner

WIPE DISPENSER AND METHODS

CROSS-REFERENCE TO RELATED APPLICATIONS

This application claims the benefit of U.S. Provisional Patent Application No. 63/125,719, filed Dec. 15, 2020, which is incorporated by reference herein in its entirety.

TECHNICAL FIELD

This disclosure concerns a dispenser for wipes. In particular, this disclosure concerns a dispenser that applies a composition onto the wipe, as the wipe is being pulled out of the dispenser and methods for use.

BACKGROUND

Microorganisms exist everywhere. People encounter microorganisms when eating or drinking, taking transportation such as airplanes, trains, and busses, visiting hotels and restaurants, studying in schools, universities, and cafeterias, completing the tasks of daily life at an office, workplace, grocery store, or retail store, in their homes, and seeking healthcare treatment at a hospital or healthcare facility. Some microorganism are harmless while others lead to infections, disease, and illness. For example, *Clostridium difficile* (*C. diff*) is a leading cause of health care associated infections. To prevent microorganisms from causing infections, disease, and illness, hard surfaces such as counters, tables, handles are wiped down to be disinfected to remove *C. diff* and other types of microorganisms.

Presaturated disposable wipes are a fast-growing means of applying disinfectants. The convenience of having a readily available disinfectant including applicator at point of use is extremely attractive. Despite the convenience of the presaturated wipes themselves, the current delivery "systems" (i.e., canisters, pouches) have significant drawbacks. For example, canisters are often left open, causing the wipes to dry out and thus their level of efficacy is uncertain. Wipes dispensed from plastic canisters also present challenges with respect to becoming unthreaded (wipe roll falls back into canister), or "roping" (more than one wipe is dispensed from the canister without breaking at the perforation). Dry wipes are also an appealing trend in disinfection, allowing end users, for example, to apply a diluted concentrate disinfectant directly to a roll of dry wipes, allowing the customer to "create their own wipes" on site. This approach has advantages, but also comes with potential drawbacks, for example, over or under saturation of the dry wipe with liquid disinfectant, leading to inconsistency in how many wipes are needed to wet a particular surface. Further, some dilutable chemistries have a short effective life after dilution, which may present logistical challenges to ensure that the wipes are not being used after their effectiveness is past.

There is a need for a method of providing/dispensing disinfectant wipes which are: consistently wetted, not subject to drying out between users (e.g., top left off canisters), easy to dispense one at a time without excessive fall back or roping, and in which in some cases can be used to mix chemistry which may lose efficacy within a short time after preparation to be "mixed" at the point of use. Such dispensers can find use in health care facilities, schools, grocery stores or in many other examples.

SUMMARY

A wipe dispenser is provided that improves the prior art.

In general, this disclosure provides a hard surface wipe dispenser that has a reservoir as part of the dispenser for applying a composition onto the wipe, as the wipe is being pulled out of the dispenser. One of the advantages of such a dispenser is it provides freshly saturated, consistently wetted wipes, and that one or more liquids can be added to the wipe via the dispenser.

A dispensing and/or mixing assembly is provided and includes a vessel having a surrounding wall defining an interior volume therewithin, and at least a first opening in communication with the interior volume. A first pump is within the first opening and oriented to convey a first liquid stored within the interior volume. In some embodiments, a bottle having a second pump is oriented to convey a second liquid stored within the bottle. A funnel arrangement is in downstream communication with the first pump and in some embodiments a second pump. The funnel arrangement includes an upper funnel housing including an open end sized to receive a wipe and a wetting and/or mixing chamber in communication with the first pump, and in some embodiments second pump and constructed and arranged to mix the first liquid and second liquid; and a dispensing funnel in communication with the upper funnel housing and downstream of the mixing chamber, wherein a wipe can be pulled through the lower dispensing funnel which is assembled to the upper funnel housing and wetted with a mixture of the first liquid and second liquid from the mixing chamber.

In one or more examples, the bottle is held by the vessel.

In some arrangements, the vessel wall includes a bottle holder fixed thereto and being sized to hold the bottle.

Some embodiments further include tubing connecting the bottle to the mixing chamber.

In examples, the mixing chamber includes an internally mounted splitter to facilitate mixing of the first liquid and second liquid.

In example embodiments, the funnel arrangement further includes a cap over the open end of the upper funnel housing; the cap including a wipe supply opening constructed and arranged to receive a supply of wipes; a first port in communication with the first pump and the mixing chamber; and a second port in communication with the second pump and the mixing chamber.

In one or more embodiments, the upper funnel housing defining the mixing chamber has a sloped wall sloping downwardly away from the first and second ports and toward the dispensing funnel.

Many embodiments further include a splitter within the mixing chamber and mounted along the sloped wall.

In some implementations, the dispensing funnel is a separate piece forming a sealed connection with the upper funnel housing.

The dispensing funnel can be a single unitary molded member with the upper funnel housing.

Some example embodiments may further include a removable wipe threading tool positioned within the funnel arrangement. The wipe threading tool can comprise: a nose having an elongated slot with opposing teeth along the slot; and a handle at an end opposite of the nose; the handle including an open ring.

The vessel and the bottle can be formed as a single unitary member.

In some embodiments, there further includes a fin between the vessel and the bottle.

In another aspect, a dispenser for wipes is provided. The dispenser comprises the mixing and dispensing assembly as variously characterized above; and a linkage assembly secured to the funnel arrangement, the first pump, and the second pump. When a force is applied to the funnel arrangement, the linkage assembly transfers the force to actuate the first pump and second pump.

In example embodiments, the linkage assembly includes an arm arrangement and a spring arrangement; the arm arrangement being pivotable between an idle position and an actuating position and being biased by the spring arrangement to the idle position.

In many examples, the funnel arrangement includes at least one post; and the arm arrangement has at least one open slot sized to receive and hold the at least one post.

Example embodiments include the funnel arrangement having first and second posts extending from opposite sides of the funnel arrangement; the arm arrangement having first and second spaced arms; each of the first and second arms having a free end; the free end of each of the first arm and second arm defining an open slot sized to removably receive and hold one of the first and second posts; and the arm arrangement having a base member extending between the first and second spaced arms.

In one or more embodiments, the base member defines a second pump receiver sized to removably receive the second pump.

In some embodiments, the funnel arrangement defines a first pump receiver, adjacent the mixing chamber sized to receive the first pump; the first pump receiver being in between the first and second posts.

The spring arrangement can further include a spring holder; a first spring mounted on the spring holder and connected to the first arm; and a second spring mounted on the second holder and connected to the second arm.

In many embodiments, the dispenser can have a housing having a surrounding wall defining an interior volume; the housing being openable to provide access to the interior volume; the housing defining a wipe dispenser opening through the wall sized to permit a treated wipe to be pulled therethrough; and the mixing and dispensing assembly being removably and replaceably mounted within the interior volume.

In one or more examples, the housing interior volume includes a wipe storage volume sized to hold a supply of wipes therein.

In many implementations, the housing has an opposite top and bottom and further includes a shelf within the interior volume, spaced from the top and bottom, and constructed and arranged to hold a supply of wipes between the shelf and the top of the housing.

The housing can further include a flexible band secured to the housing interior and sized to hold a supply of wipes in the wipe storage volume.

In some examples, the housing further includes a backwall and a ledge projecting perpendicular from the backwall into the interior volume; the ledge having an open gap.

The vessel and bottle are connected with a fin therebetween, in examples, and the fin is received within the open gap of the ledge.

In example embodiments, there further includes an electronic module to detect whether the mixing and dispensing assembly is in place in the housing.

In examples, the electronic module sends a signal when the first pump and second pump are actuated; and/or the electronic module provides a notification for when servicing and replacement of the mixing and dispensing assembly is needed.

Some embodiments may further include a push bar operatively attached to the funnel arrangement to selectively apply the force to the funnel arrangement; the linkage assembly transferring the force to actuate the first pump and second pump.

The dispenser can further have: a housing having a surrounding wall defining an interior volume; the housing being openable to provide access to the interior volume; the housing defining a wipe dispenser opening through the wall sized to permit a treated wipe to be pulled therethrough; the mixing and dispensing assembly being removably and replaceably mounted within the interior volume; and the push bar being pivotably attached to the housing.

Some embodiments can further comprise a biasing arrangement positioned between the push bar and the housing.

In examples, the funnel arrangement includes a pair of axially spaced and radially outward protruding ribs; the push bar includes a push member extending between a pair of arms; the push member having an open slot; the open slot receiving the funnel arrangement between the protruding ribs.

In another aspect, a method of using a dispenser for wipes is provided. The method includes applying a force to pull down a funnel arrangement and actuate a first pump and a second pump, which conveys a first liquid and a second liquid to a mixing chamber to mix in the funnel arrangement; and allowing the mixed first liquid and second liquid to wet a portion of a wipe extending through a wipe dispenser in a housing.

In some examples, the step of applying a force includes grasping a portion of the wipe and pulling the wipe downwardly.

In some examples, the step of applying a force includes pressing down on a push bar, the push bar being operatively connected to the funnel arrangement.

The step of actuating the first pump and second pump happens simultaneously, in preferred methods.

In many example methods, the step of pulling down the funnel arrangement includes pivoting an arm arrangement downwardly against a spring; the arm arrangement actuating the first pump and second pump.

Some example methods can further comprise opening the housing; and positioning a supply of wipes in the housing.

In some example methods, there are the further steps of opening the housing; removing a mixing and dispensing assembly including the funnel arrangement; a vessel; the first pump oriented to convey the first liquid stored within the vessel; and a bottle having the second pump oriented to convey the second liquid stored within the bottle.

In another aspect, a mixing and dispensing assembly is provided comprising: a vessel having a surrounding wall defining an interior volume therewithin, and at least a first opening in communication with the interior volume; a first pump within the first opening and oriented to convey a first liquid stored within the interior volume; a funnel arrangement in downstream communication with the first pump; the funnel arrangement including: an upper funnel housing including an open end sized to receive a wipe and a mixing chamber in communication with the first pump; and a dispensing funnel in communication with the upper funnel housing and downstream of the mixing chamber, wherein a wipe can be pulled through the dispensing funnel from the upper funnel housing and wetted with the first liquid.

In examples, the funnel arrangement further includes: a cap over the open end of the upper funnel housing; the cap including, a wipe supply opening constructed and arranged to receive a supply of wipes; and a first port in communication with the first pump and the mixing chamber.

For some embodiments, an upper funnel housing defines the mixing chamber and has a sloped wall sloping downwardly away from the first port and toward the dispensing funnel.

In example embodiments: the dispensing funnel is a separate piece forming a sealed connection with the upper funnel housing; and/or the dispensing funnel is a single unitary molded member with the upper funnel housing.

Some arrangements further include a removable wipe threading or starter tool positioned within the funnel arrangement.

Some arrangements further include a housing having a surrounding wall defining an interior volume; the housing being openable to provide access to the interior volume; the housing defining a wipe dispenser opening through the wall sized to permit a treated wipe to be pulled therethrough; and the mixing and dispensing assembly being removably and replaceably mounted within the interior volume.

Example embodiments can further comprise an electronic module to detect whether the mixing and dispensing assembly is in place in the housing.

In some examples, the electronic module sends a signal when the first pump and second pump are actuated.

The electronic module may provide a notification for when servicing and replacement of the mixing and dispensing assembly is needed.

Some examples further include a flexible band secured to the housing interior and sized to hold a supply of wipes in the wipe storage volume.

The housing can further include a backwall and a ledge projecting perpendicular from the backwall into the interior volume; the ledge having an open gap.

In one or more embodiments, the vessel and bottle are connected with a fin therebetween; the fin being received within the open gap of the ledge.

In another aspect, a method of using a wetting dispenser for wipes is provided; the method comprising: actuating a first pump in a housing, which conveys a first liquid to a chamber; and allowing the first liquid to wet a portion of a wipe within a funnel arrangement.

In example methods:

- the step of actuating a first pump includes grasping a portion of a wipe extending through a wipe dispenser and pulling the wipe downwardly to pull down the funnel arrangement, which actuates the first pump.
- the step of actuating a first pump includes grasping and pulling down the funnel arrangement, which actuates the first pump.
- the step of actuating a first pump includes using a lever to pull down the funnel arrangement, which actuates the first pump.
- the step of using a lever includes pushing down a push bar operatively connected to the funnel arrangement.
- the step of pulling down the funnel arrangement includes pivoting an arm arrangement downwardly against a spring and actuating the first pump.

The method can further include: opening the housing; and positioning a supply of wipes in the housing.

The method can further include: opening the housing; removing an assembly including the funnel arrangement; a vessel; and the first pump oriented to convey the first liquid stored within the vessel.

In another aspect, a dispensing assembly is provided including: a vessel having a surrounding wall defining an interior volume therewithin, and at least a first opening in communication with the interior volume; a first pump within the first opening and oriented to convey a first liquid stored within the interior volume; and a funnel arrangement in downstream communication with the first pump; the funnel arrangement including: an upper funnel housing including an open end sized to receive a wipe and a chamber in communication with the first pump and constructed and arranged to receive the first liquid; and a dispensing funnel in communication with the upper funnel housing and downstream of the chamber, wherein a wipe can be pulled through the dispensing funnel from the upper funnel housing and wetted with the first liquid from the chamber.

In examples, the funnel arrangement further includes: a cap over the open end of the upper funnel housing; the cap including, a wipe supply opening constructed and arranged to receive a supply of wipes; and a first port in communication with the first pump and the mixing chamber.

In some embodiments, the upper funnel housing defining the mixing chamber has a sloped wall sloping downwardly away from the first port and toward the dispensing funnel.

In examples, the dispensing funnel is a single unitary molded member with the upper funnel housing.

Some embodiments further include a removable wipe threading or starter tool positioned within the funnel arrangement.

The wipe threading or starter tool can comprise a nose having an elongated slot with opposing teeth along the slot; and a handle at an end opposite of the nose; the handle including an open ring.

In another aspect, a mixing and dispensing assembly is provided comprising: a vessel having a surrounding wall defining an interior volume therewithin, and at least a first opening in communication with the interior volume; a first pump within the first opening and oriented to convey a first liquid stored within the interior volume; a bottle having a second pump oriented to convey a second liquid stored within the bottle; the vessel and bottle being a single unitary member; a funnel arrangement in downstream communication with the first pump and second pump; and a fin between the vessel and the bottle.

In one or more embodiments, the funnel arrangement includes an open end sized to receive a wipe and a mixing chamber in communication with the first pump and second pump and constructed and arranged to mix the first liquid and second liquid; and a dispensing portion downstream of the mixing chamber, wherein a wipe can be pulled through the dispensing portion and wetted with a mixture of the first liquid and second liquid from the mixing chamber.

Some examples further include tubing connecting the bottle to the mixing chamber.

In example embodiments, the mixing chamber includes an internally mounted splitter to facilitate mixing of the first liquid and second liquid.

The funnel arrangement can further include: a cap over the open end including, a wipe supply opening constructed and arranged to receive a supply of wipes; a first port in communication with the first pump and the mixing chamber; and a second port in communication with the second pump and the mixing chamber.

In examples, the mixing chamber has a sloped wall sloping downwardly away from the first and second ports and toward the dispensing portion.

Some arrangements further include a splitter within the mixing chamber and mounted along the sloped wall.

Example embodiments can further include a removable wipe threading or starter tool positioned within the funnel arrangement.

In one or more embodiments, the wipe threading or starter tool comprises: a nose having an elongated slot with opposing teeth along the slot; and a handle at an end opposite of the nose; the handle including an open ring.

In another aspect, a mixing and dispensing assembly is provided comprising: (a) a vessel having a surrounding wall defining an interior volume therewithin, and at least a first opening in communication with the interior volume; (b) a first pump within the first opening and oriented to convey a first liquid stored within the interior volume; (c) a bottle having a second pump oriented to convey a second liquid stored within the bottle; and (d) a funnel arrangement in downstream communication with the first pump and second pump; the funnel arrangement including: (i) a mixing chamber in communication with the first pump and second pump and constructed and arranged to mix the first liquid and second liquid; and (ii) a dispenser in communication with the mixing chamber, wherein a mixture of the first liquid and second liquid from the mixing chamber can flow therethrough.

In example embodiments, the assembly further includes a catch tray positioned to collect the mixture from the dispenser.

The assembly can further include tubing connecting the bottle to the mixing chamber.

In examples, the mixing chamber includes an internally mounted splitter to facilitate mixing of the first liquid and second liquid.

A dispenser is provided comprising the mixing and dispensing assembly above, and a linkage assembly secured to the funnel arrangement, the first pump, and the second pump; wherein when a force is applied to the funnel arrangement, the linkage assembly transfers the force to actuate the first pump and second pump.

In some examples, the linkage assembly includes an arm arrangement and a spring arrangement; the arm arrangement being pivotable between an idle position and an actuating position and being biased by the spring arrangement to the idle position.

In another aspect, a method of using a wetting dispenser is provided; the method comprising: applying a force to pull down a funnel arrangement and actuate a first pump and a second pump, which conveys a first liquid and a second liquid to a mixing chamber to mix in the funnel arrangement; and allowing the mixed first liquid and second liquid to dispense downstream of the funnel arrangement.

Example methods include the step of applying a force includes pressing down on a push bar, the push bar being operatively connected to the funnel arrangement.

Example methods include the step of actuating the first pump and second pump happens simultaneously.

In example methods, the step of pulling down the funnel arrangement includes pivoting an arm arrangement downwardly against a spring; the arm arrangement actuating the first pump and second pump.

Example methods further include collecting the mixed first liquid and second liquid in a catch tray positioned below the funnel arrangement.

Example methods can further include a step of wetting a wipe by dipping the wipe in the mixed first liquid and second liquid in the catch tray.

The method may further include a step of wetting a wipe by placing the wipe in the catch tray to soak up the mixed first liquid and second liquid.

The method may further include a step of removing the catch tray to carry the mixed first liquid and second liquid to another location.

A variety of examples of desirable product features or methods are set forth in the description that follows, and in part, will be apparent from the description, or may be learned by practicing various aspects of this disclosure. The aspects of this disclosure may relate to individual features, as well as combinations of features. It is to be understood that both the foregoing detailed description are explanatory only and are not restrictive of the claimed inventions.

BRIEF DESCRIPTION OF THE DRAWINGS

FIG. 28 A is an enlarged view of portion A of FIG. 28;

DETAILED DESCRIPTION

Overview

Figure 1:
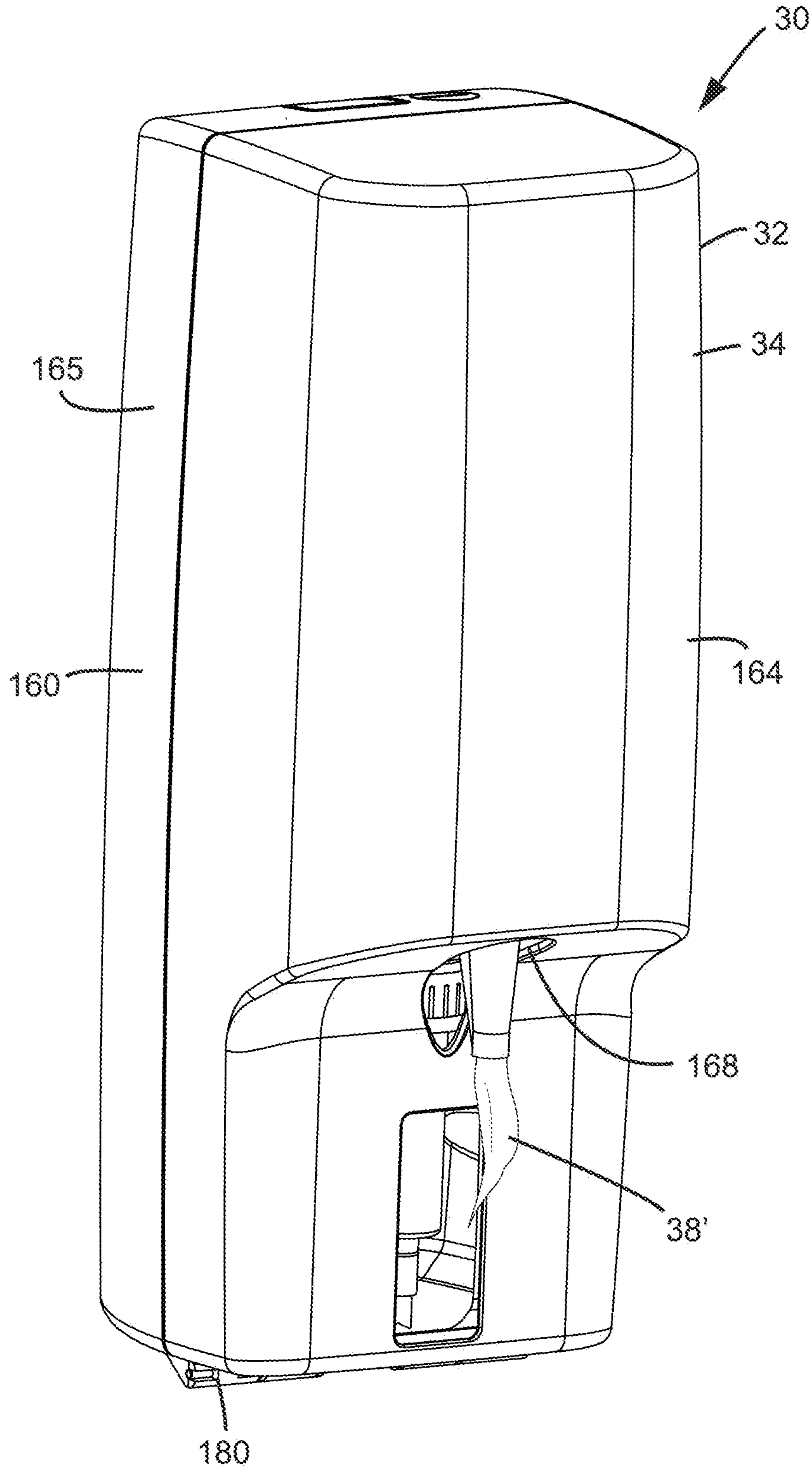
FIG. 1 is a schematic, perspective view of a dispenser for wipes, constructed in accordance with principles of this disclosure.
Figure 2:
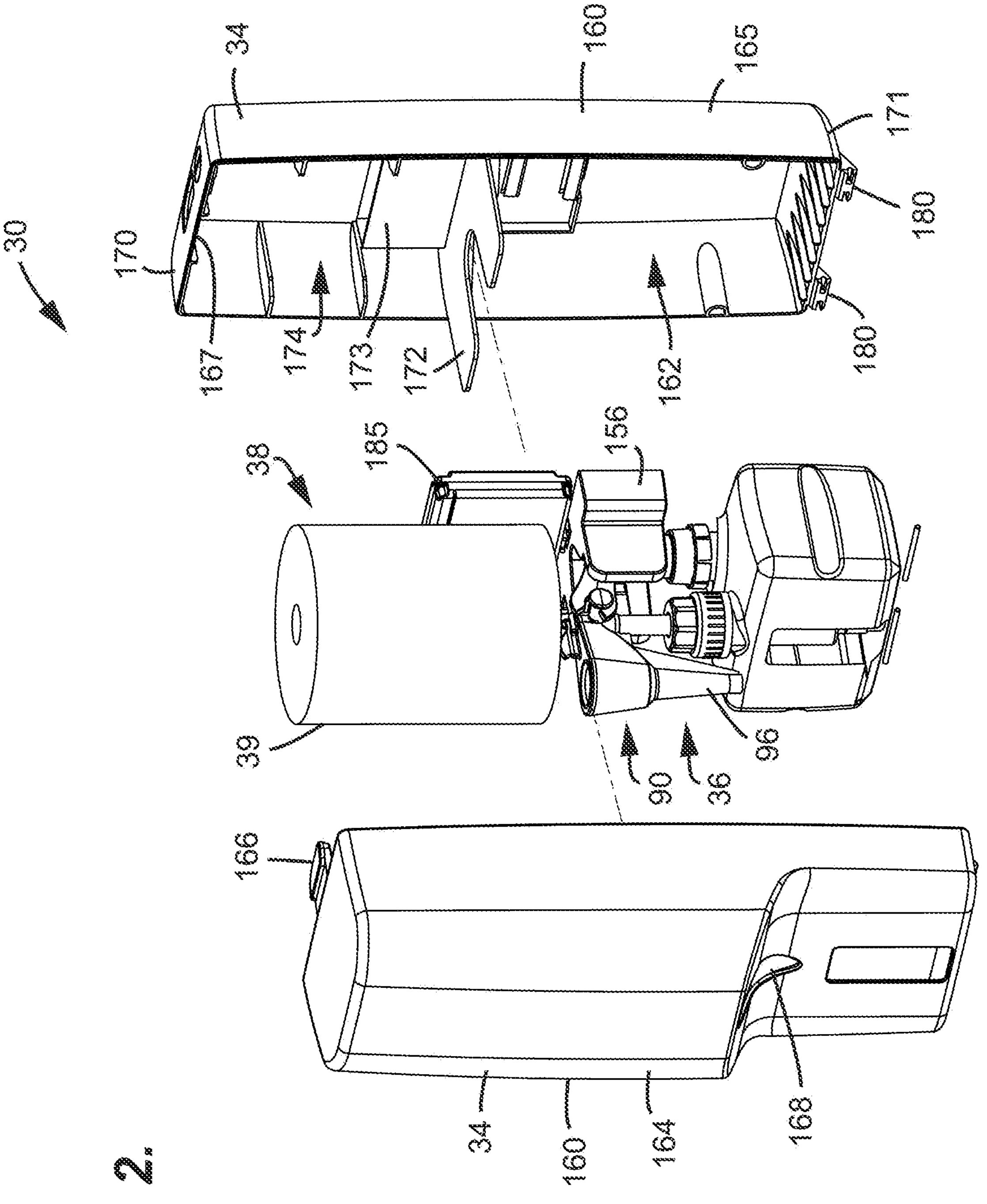
FIG. 2 is an exploded perspective view of the dispenser of FIG. 1, showing a housing and internal components including a mixing and dispensing assembly and a wipe supply.

FIGS. 1 and 2 show a system 30 for applying a composition onto a disposable wipe and dispensing the disposable wipe. The "composition" as used herein that can be applied onto a disposable wipe, as used herein, can be in many different forms, such as liquid, solid, colloid, gel, vapor, or combinations thereof. The composition can be a formulated product or a non-formulated product including water, a single raw material, multiple raw materials, or a combination of water and one or more raw materials.

The system 30 includes a dispenser 32. The dispenser includes a housing 34, a removable and replaceable mixing and dispensing assembly 36, and a supply of wipes 38, depicted in FIG. 1 as showing only a portion of one of the wipes 38'. As used herein, a wipe that has been wetted with a composition and is projecting from the housing 34 for use is depicted as wipe 38'. The wipes 38 can be in various forms, including, in a non-limiting example, a continuous roll 39 of wipes 38 with periodic perforated areas for convenient separation into individual wipes 38. The continuous sheet with the perforated areas can also be in other forms, such as folded, for example. Many other embodiments are possible.

In general, the system 30 can be used to apply or dose one of the wipes 38 using a composition from the mixing and dispensing assembly 36 onto the wipe 38, as the wipe 38 is being removed from the dispenser 32.

In another example system, the system can be "wipeless". Such a system includes mixing liquids and then dispensing the mixed liquids into either a collection tray or directly onto a wipe or towel placed under a dispenser of the mixed liquids. An example embodiment of this system is shown in FIGS. 31-34.

Example Mixing and Dispensing Assembly 36

Figure 6:
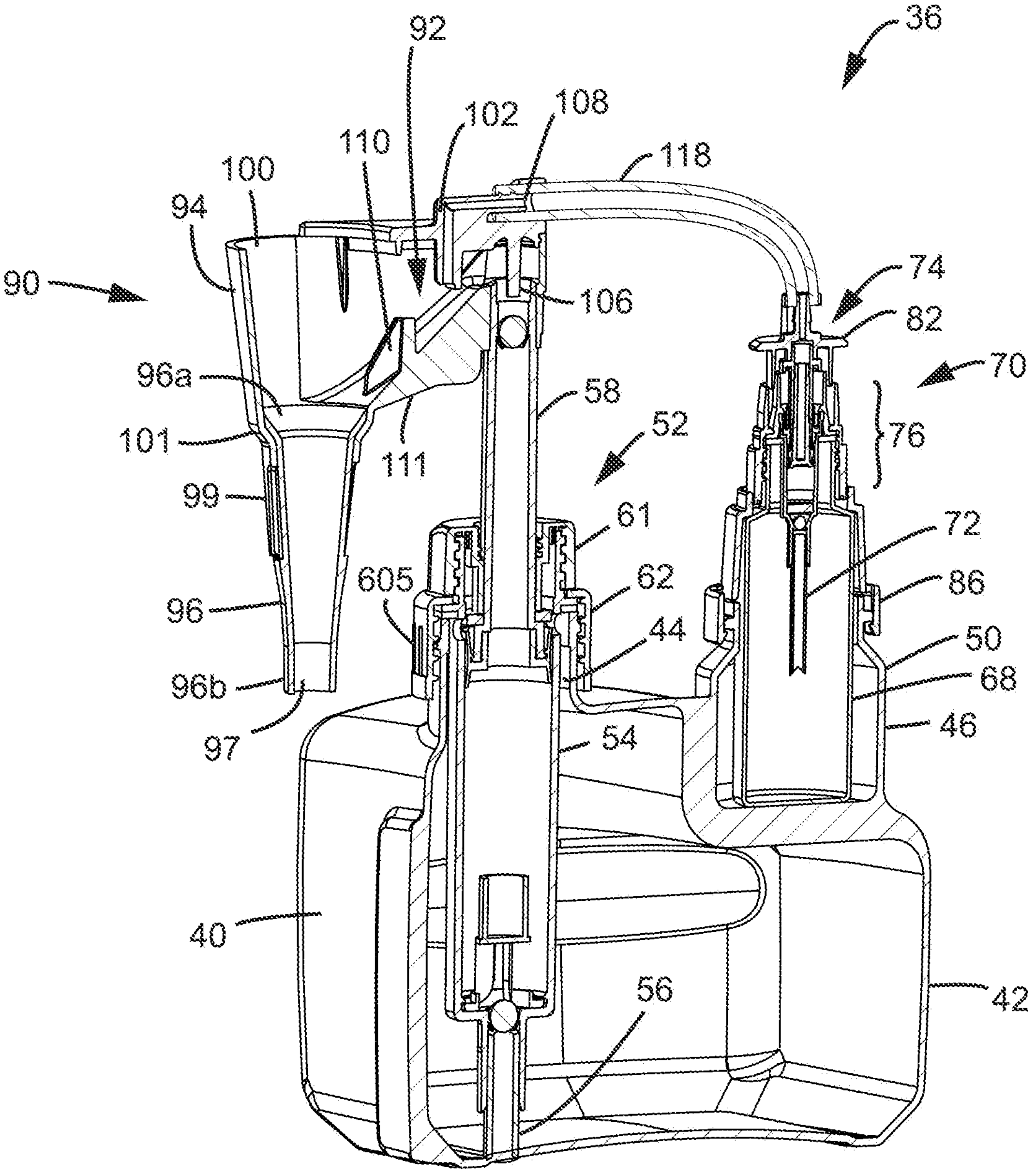
FIG. 6 is a cross-sectional view of the mixing and dispensing assembly of FIG. 5.

In reference now to FIG. 6, one embodiment of the mixing and dispensing assembly is depicted at 36. The mixing and dispensing assembly 36 is preferably removable and replaceable from the housing 34. Typically, the mixing and dispensing assembly 36 will contain the supply of the composition to be used on the wipe 38, and when the composition is exhausted, used up, or expired, the entire mixing and dispensing assembly 36 can be removed from the housing 34, disposed of, and replaced with a new mixing and dispensing assembly 36 having a refilled supply of the composition. Alternatively, the assembly 36 can be refilled and reused.

In accordance with principles of this disclosure, the mixing and dispensing assembly 36 includes a vessel 40. The vessel 40 includes a surrounding wall 42 defining an interior volume 43 therewithin. The vessel 40 can be used to hold and store a variety of materials that are used as part of the composition to be placed on the wipe 38. For example, the composition within the vessel 40 can be a liquid in the form of hydrogen peroxide. A variety of compositions or chemicals can be used.

The vessel 40 includes at least a first opening 44 in communication with the interior volume 43. In the preferred embodiment shown, the first opening 44 is along a top 45 of the vessel 40, when the mixing and dispensing assembly 36 is positioned in a normal and upright position, and as it is positioned within the housing 34.

The vessel 40, in the particular embodiment illustrated, also includes a tubular wall 46 (FIG. 6) forming an enclosed holder 50 (bottle holder 50), the purpose of which is described further below.

Figure 4:
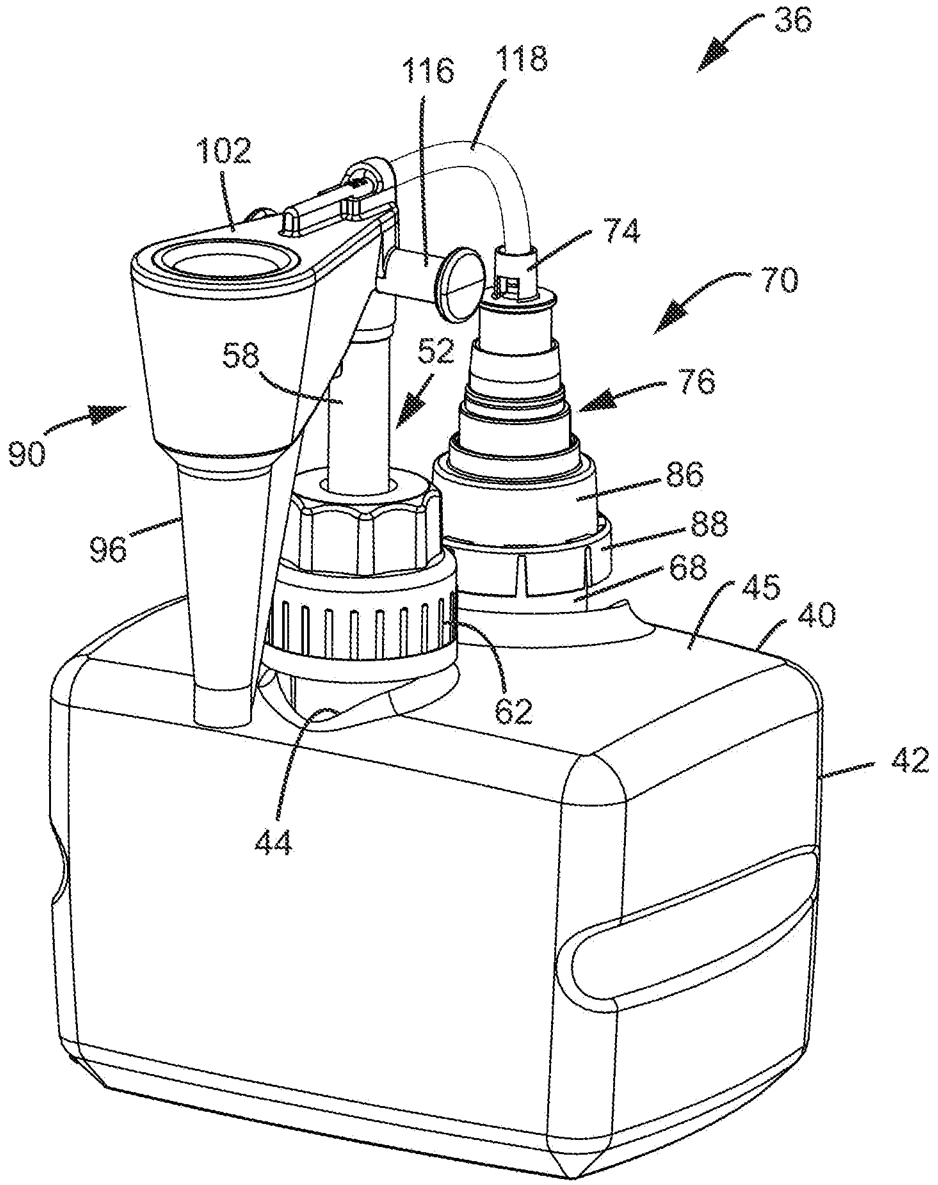
FIG. 4 is a perspective view of the mixing and dispensing assembly shown in FIGS. 2 and 3.
Figure 5:
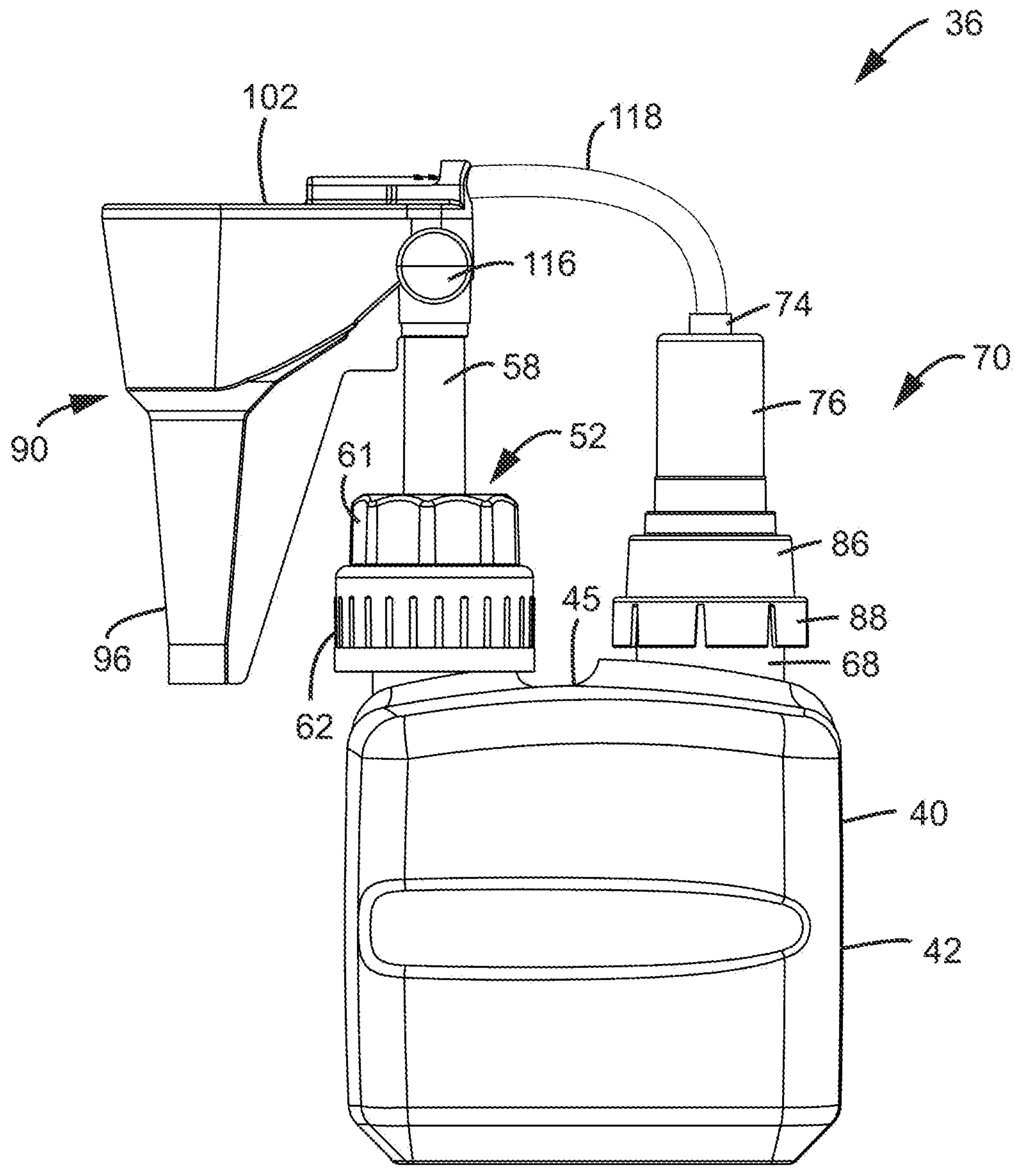
FIG. 5 is a side view of the mixing and dispensing assembly of FIG. 4.

Still in reference to FIGS. 4-6, the mixing and dispensing assembly 36 further includes a first pump 52. The first pump 52 is held within the first opening 44 and is positioned or oriented to convey a first liquid stored within the interior volume 43 of the vessel 40. For example, if the vessel 40 is storing hydrogen peroxide, the first pump 52 will convey the hydrogen peroxide stored within the vessel 40.

Figure 7:
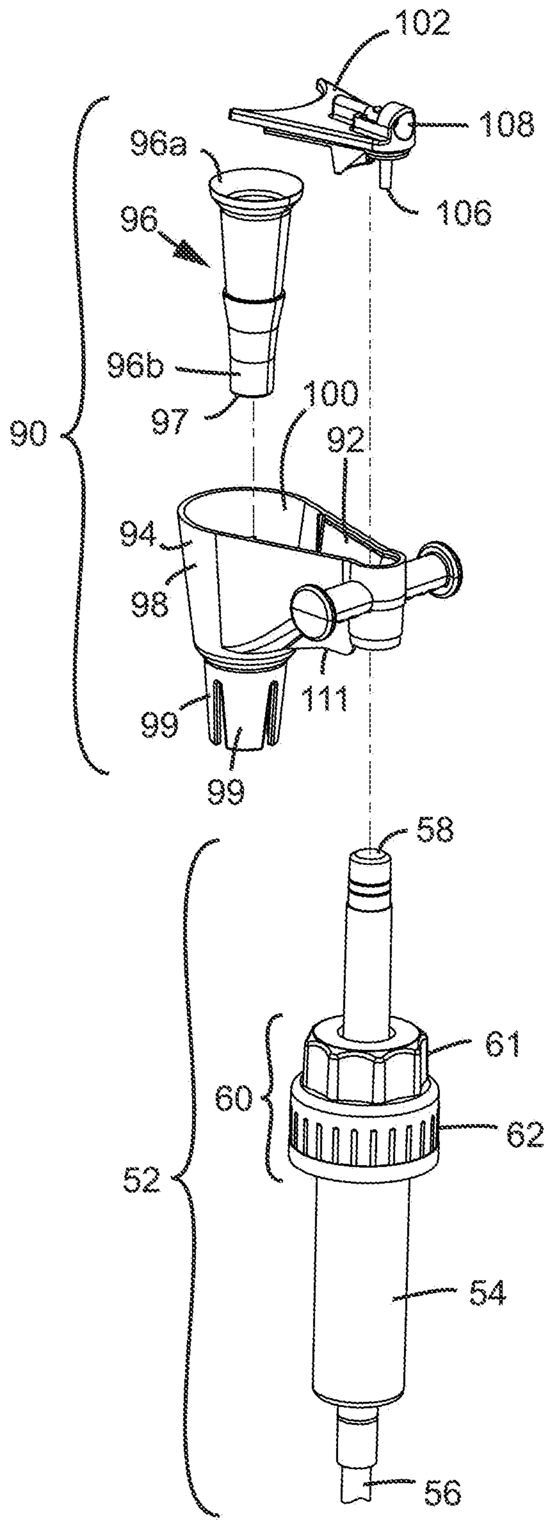
FIG. 7 is an exploded perspective view of a funnel arrangement and a first pump, used as part of the mixing and dispensing assembly of FIGS. 4-6.

In reference now to FIGS. 6 and 7, the first pump 52 includes a pump container 54. The pump container 54 is typically a cylindrical wall which extends through the first opening 44 in the vessel 40. Projecting downwardly from the pump container 54 is a dip tube 56. The dip tube 56 projects from the pump container 54 to the bottom 49 of the vessel 40. The dip tube 56 is an open tube, which sucks in liquid from the interior volume 43 of the vessel 40, when the pump is actuated.

Mounted within the container 54 is a slide tube 58. The slide tube 58 is slidably mounted within the interior of the container 54 and will slide therewithin to change the interior volume within the container 54 and created the vacuum draw through the dip tube 56.

Located outside of the vessel 40 and surrounding an upper portion of the pump container 54 and slide tube 58 is a cap assembly 60. The cap assembly 60 can include a pump nut 61 axially against a pump bottle nut 62. Moving the slide tube 58 upwardly and away from the dip tube 56 will convey liquid from the vessel 40 through dip tube 56, into the pump container 54, and through the interior of the slide tube 58.

In reference again to FIGS. 4-6, the mixing and dispensing assembly 36 further includes an optional container or bottle 68. The optional bottle 68 is sized to hold a part of the composition that can be used for applying to the wipes 38, in some systems. For example, the bottle 68 can hold a second liquid within its interior 69 (FIG. 9) to be mixed with the first liquid within the vessel 40, when it is desired to use a mixture. The bottle 68 can have a variety of shapes, and in this embodiment, it has a projecting neck 66 with an opening 67. The interior 69 can be accessed through the opening 67. In some examples, the second liquid stored within the bottle 68 can be many different types or variations of secondary liquids. In preferred constructions, the bottle 68 will have a smaller volume than the volume of vessel 40, as the quantity needed for mixing to apply to the wipes 38 will be lower in proportion. It should be understood that in some implementations, the system 36 will only have the wipes 38, and no bottle 68 will be provided.

While the dispenser system 30 can have many implementations, including the bottle 68 being located anywhere convenient within the housing 34, in many embodiments, it will be convenient to have the bottle 68 connected or attached in some manner to the vessel 40. In this embodiment, the bottle 68 is held by the vessel 40. For example, in this embodiment, the holder 50 which is an integral part of the vessel 40, is sized to snugly hold the bottle 68.

The bottle 68 has a second pump 70 in communication therewith. The second pump 70 is oriented to convey the second liquid stored within the bottle 68. Attention is directed to FIGS. 6, 8-10, and 13, in which various parts of the bottle 68 and second pump 70 are illustrated.

The second pump 70 includes a dip tube 72 extending within the interior of the bottle 68. The second pump 70 further includes a nozzle 74 positioned within a slide assembly 76. The slide assembly 76 is threadably attached to the neck 66 of the bottle 68. When the nozzle 74 receives downward force, it engages the slide assembly which creates a vacuum pressure in the dip tube 72 in order to draw the second liquid within the bottle 68 into the dip tube 72 and into nozzle 74.

The nozzle 74 includes a dispenser outlet 78 surrounded by an outer wall 80. Orthogonal to the outer wall 80 and positioned in about a middle section of the nozzle 74 is a flange extension 82. The flange extension 82 has an upper axial surface 83 oriented toward the outlet 78 and is sized to receive a pressing force in a downward axial direction (e.g., a direction toward the bottle 68) from an arm arrangement 122, described further below. As will be explained further below, shoulders 141, 142 (FIG. 18) on the arm arrangement 122 press against the flange extension 82, which will actuate the slide assembly 76 and cause the second liquid to be drawn through the dip tube 72, and eventually through the outlet 78 of the nozzle 74.

Figure 8:
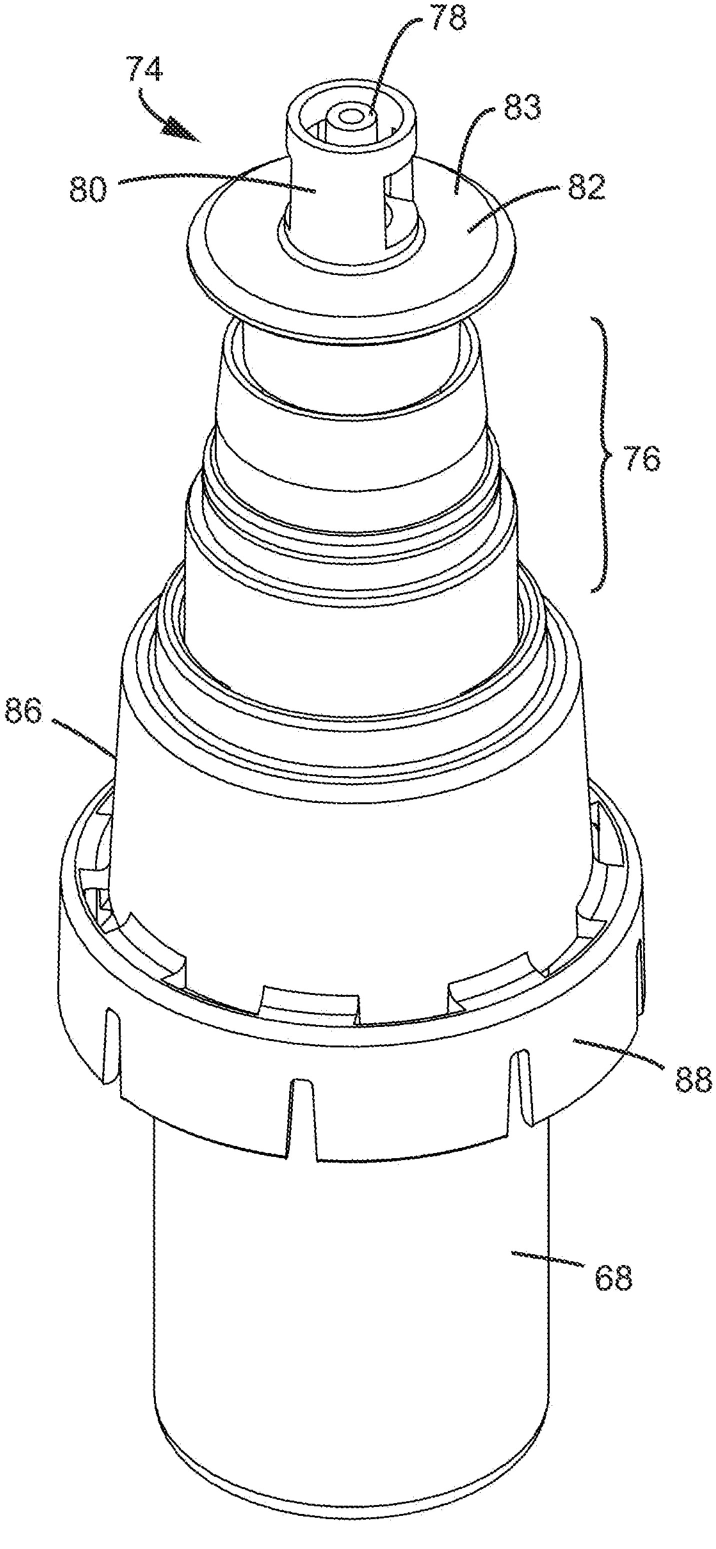
FIG. 8 is a perspective view of a second pump and bottle, used as part of the mixing and dispensing assembly of FIGS. 4-6.
Figure 9:
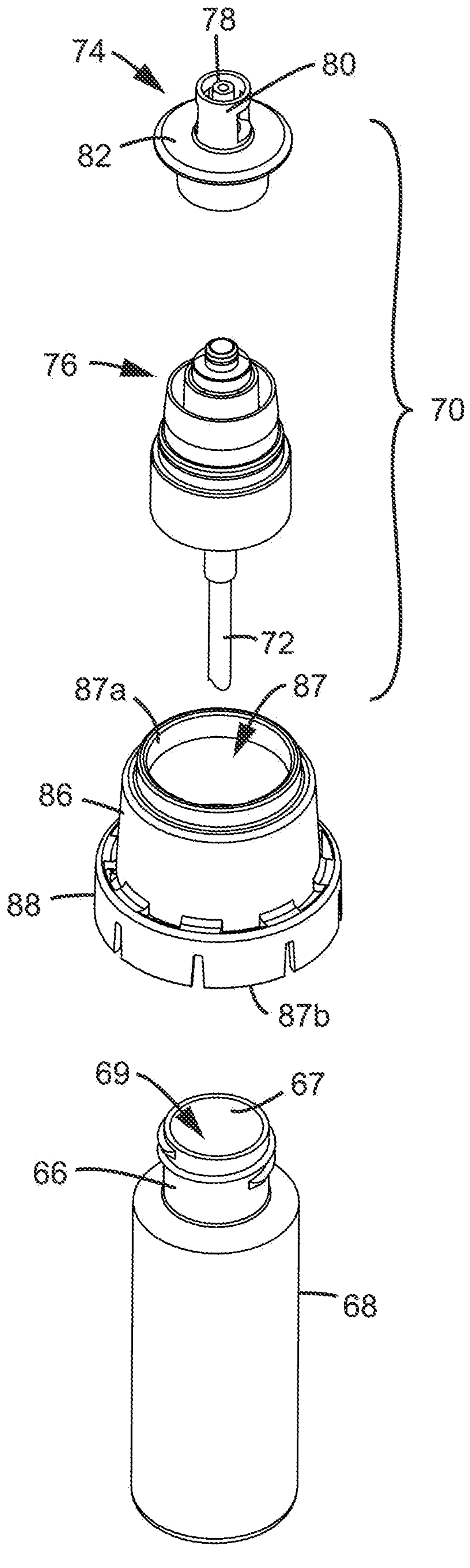
FIG. 9 is an exploded, perspective view of the second pump and bottle of FIGS. 4-6.
Figure 10:
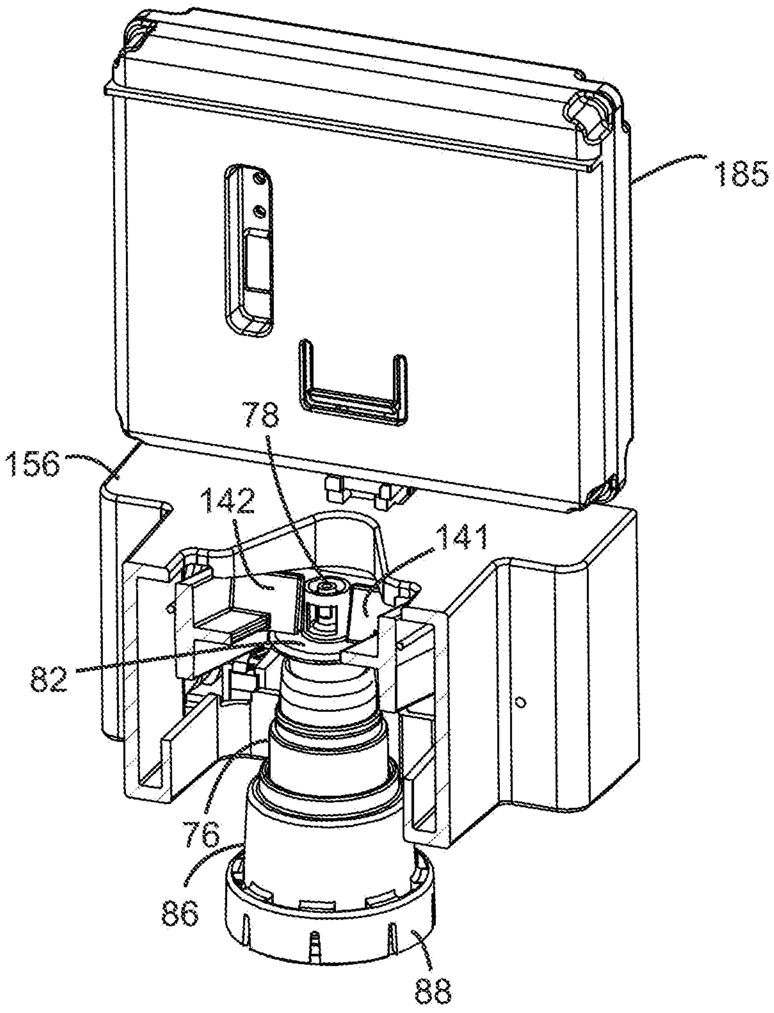
FIG. 10 is a perspective view of a subassembly, depicting a module, linkage housing, and the second pump.
Figure 11:
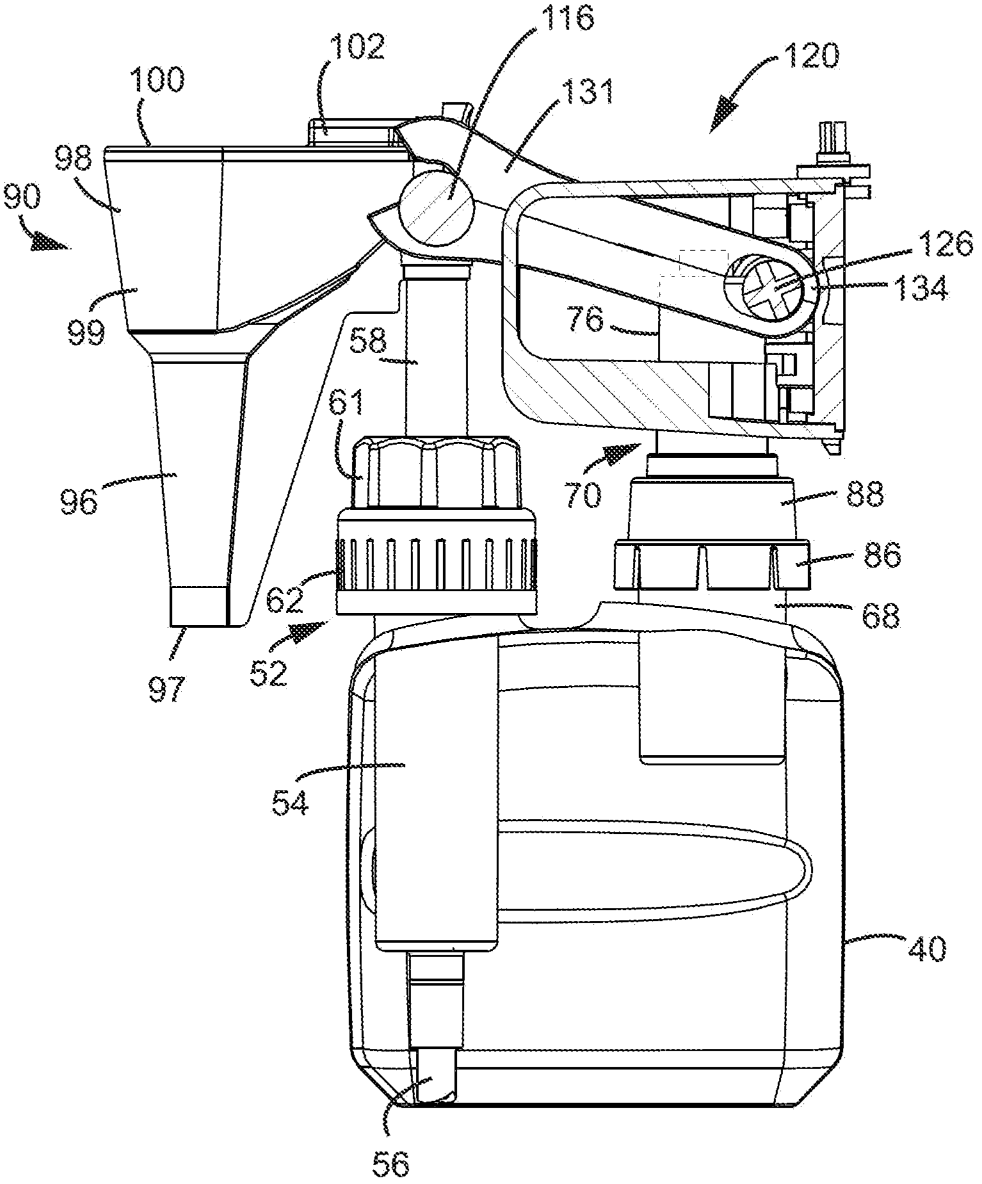
FIG. 11 is a side view of the dispenser of FIG. 3, with the housing omitted, and showing mixing and dispensing assembly of FIGS. 4-6, and showing portions of a linkage assembly in cross-section, the linkage assembly being depicted in an idle position.
Figure 12:
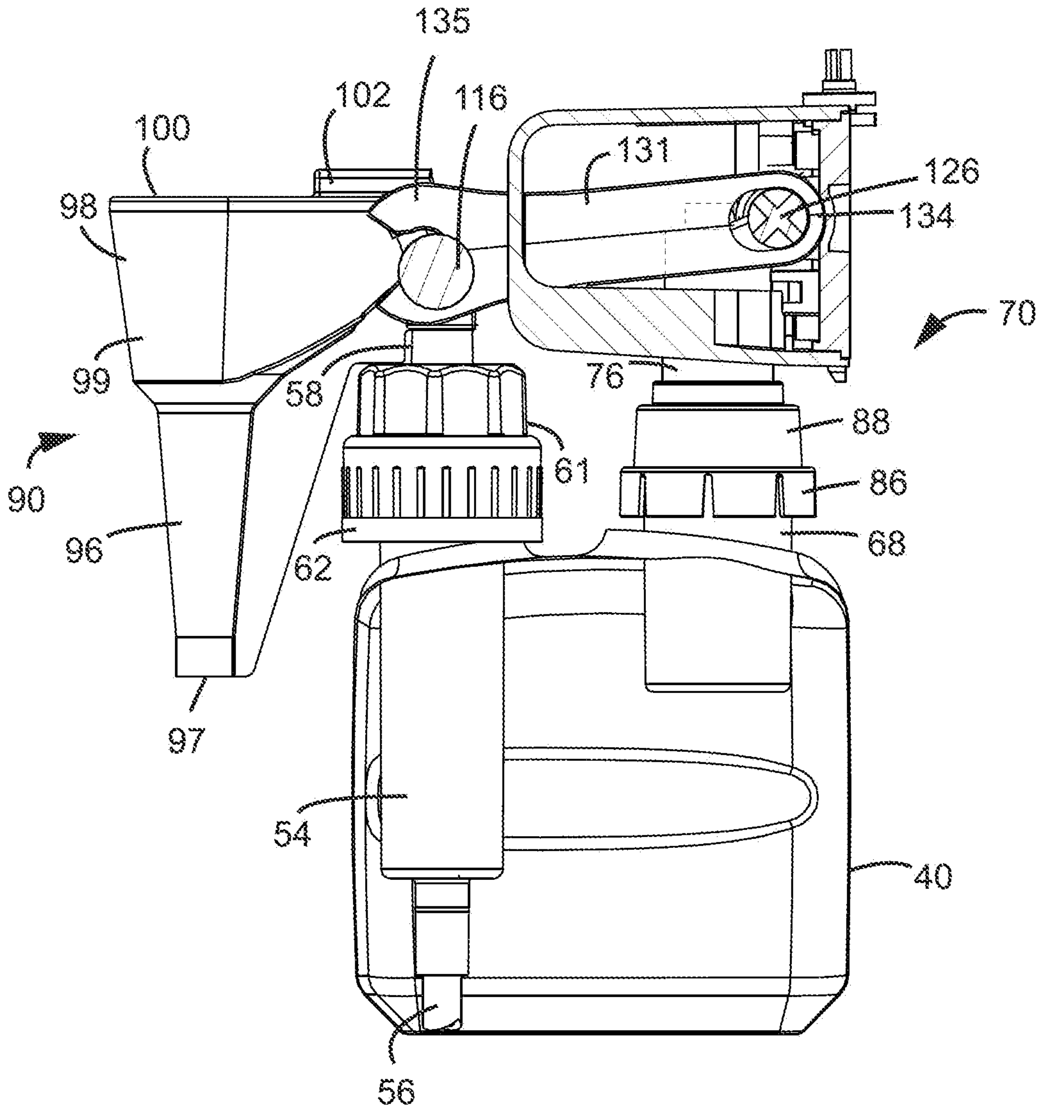
FIG. 12 is a view similar to FIG. 11 and showing the linkage assembly in an actuating position.

Also shown in FIGS. 8 and 9 is a bottle retainer 86. The bottle retainer 86 can be used secure the bottle 68 and the second pump 70 in the bottle holder 50. The bottle retainer 86 is tubular with a through opening 87, to accommodate the second pump 70 through an upper opening 87*a*, and the bottle 68 through a lower opening 87*b*. A locking collar 88 circumscribes the lower opening 87*b* and rotatably locks onto the bottle holder 50; the bottle holder 50 being fixed onto the vessel 40, in this example embodiment.

In accordance with principles of this disclosure, the mixing and dispensing assembly 36 further includes a funnel arrangement 90. The funnel arrangement 90 is in downstream communication with the first pump 52 and second pump 70. In general, the funnel arrangement 90 receives the first liquid from the vessel 40 and second liquid from the bottle 68, mixes them, and disperses them onto the wipes 38.

Figure 13:
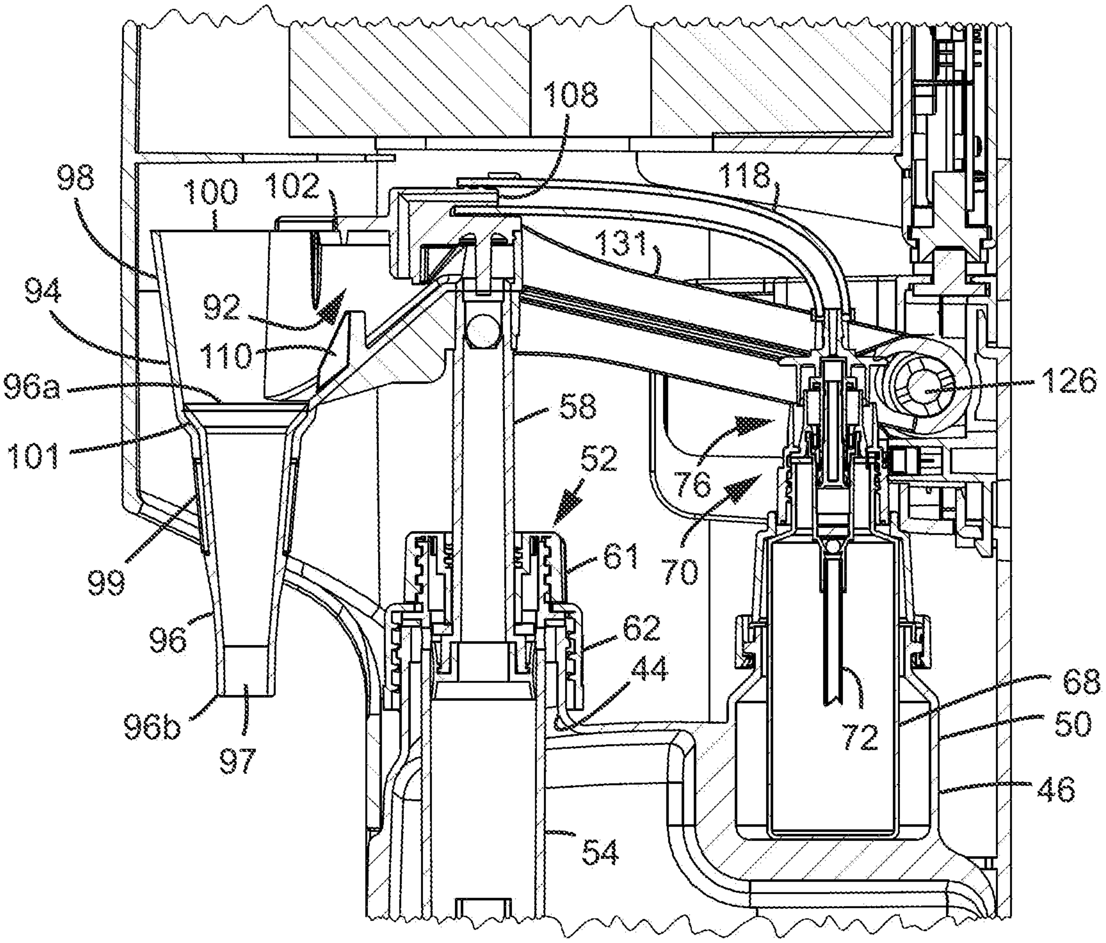
FIG. 13 is a cross-sectional view of a portion of the dispenser of FIG. 3.

In reference now to FIGS. 6, 7, and 13, an example funnel arrangement 90 is depicted. The funnel arrangement 90 includes an upper funnel housing 94 defining a mixing chamber 92 therein. The mixing chamber 92 is in communication with the first pump 52 and second pump 70 and constructed and arranged to mix the first liquid from the vessel 40 and second liquid from the bottle 68.

In FIG. 7, it can be seen how the upper funnel housing 94 includes an outer surrounding wall 98 having an open upper end 100. A cap 102 extends over the open upper end 100. The mixing chamber 92 is within the surrounding wall 98.

The cap 102 includes a first port 106 in communication with the first pump 52. In particular, the first port is in communication and extends into the slide tube 58 of the first pump 52. The first port 106 is also in communication with the mixing chamber 92, downstream of the first port 106.

The cap 102 further includes a second port 108. The second port 108 is in communication with the second pump 70 and the mixing chamber 92.

The funnel arrangement 90 further includes a dispensing funnel 96. The dispensing funnel 96 is in communication with the upper funnel housing 94 and downstream of the mixing chamber 92. In use, the wipe 38 can be pulled through the dispensing funnel 96 from the upper funnel housing 94 and dispersed (or wetted) with a mixture of the first liquid and second liquid from the mixing chamber 92.

The dispensing funnel 96 is conical in shape and tapered from an upper rim 96*a* to a narrower mouth 96*b*, ending at an outlet end 97, in order to help wet the wipe 38 as it passes through the dispensing funnel 96. In preferred implementations, the dispensing funnel 96 is a separate piece/member from the upper funnel housing 94. The dispensing funnel 96 can be used as a "starter funnel", in that, when loading a new wipe 38 from a roll 39, the lead wipe 38 can be threaded through the dispensing funnel 96 while it is still separate from the upper funnel housing 94. Then, the dispensing funnel 96 with the wipe 38 threaded through, is dropped through the open upper end 100 in the upper funnel housing 94, and then operably positioned within the upper funnel housing 94.

The upper rim 96*a* of the dispensing funnel 96 forms a lip seal 101 (FIG. 6) with an inner surface of the upper funnel housing 94, when the dispensing funnel 96 is operably mounted in the upper funnel housing 94. A lower part of the upper funnel housing includes circumferentially spaced flanges 99, which assist in holding the dispensing funnel 96 in place.

As can be seen in FIGS. 6, 7, and 13, a sloped portion 111 of the wall 98 defining the mixing chamber 92 is sloped downwardly and away from the first and second ports 106, 108 and toward the dispensing funnel 96. A splitter 110 is within the mixing chamber 92 and is mounted along the sloped wall 111. The splitter 110 can be integral with the wall 98 of the upper funnel housing 94. The splitter 110 helps to facilitate the mixing and dispersion of the chemical onto the surface of the exposed wipe, as the first liquid is conveyed from the vessel 40 and the second liquid is conveyed from the bottle 68.

In FIG. 7, it can be seen how the funnel arrangement 90 further includes at least one post 114, and in the embodiment shown, a pair of posts 114, 116. The posts 114, 116 extend from opposite sides of the funnel arrangement 90 in the vicinity of the mixing chamber 92. The purposes of the posts 114, 116 are discussed further below. A first pump receiver 117 (FIG. 7) is defined by a portion of the upper funnel housing 94 and is adjacent the mixing chamber 92. The first pump receiver 117 is sized to receive the first pump 52. In the general, the first pump receiver 117 is between the posts

114, 116. The port 106 from the cap 102 can extend into the first pump receiver 117 to make a liquid connection with the slide tube 58.

In accordance with principles of this disclosure, the mixing and dispensing assembly 36 further includes tubing 118. The tubing 118 connects the bottle 68 to the mixing chamber 92. In this example, the tubing 118 is in intimate connection with the second port 108 in the cap 102 of the funnel arrangement 90. An opposite end of the tubing 118 is connected to the nozzle 74, such that the outlet 78 of the nozzle 74 is in communication with the tubing 118. This will allow liquid within the bottle 68 to be conveyed by the second pump 70 through the tubing 118 and into the tube mixing chamber 92, where it is mixed with the first liquid from the vessel 40.

Example Dispenser

The mixing and dispensing assembly 36, as described above, can be used as part of the dispenser 32 in order to first, apply a composition to one of the wipes 38, and then to dispense the treated wipe 38. The wipe 38 can be treated by wetting it with the first liquid and second liquid.

In reference now to FIGS. 11-18, and in accordance with principles with this disclosure, a linkage assembly 120 is provided. The linkage assembly 120 is associated with the funnel arrangement 90, the first pump 52, and the second pump 70, such that when a force is applied to the funnel arrangement 90, the linkage assembly 120 transfers the force to actuate the first pump 52 and second pump 70. For example, when a person grasps the wipe 38' (FIG. 1) for use, the person will pull the wipe 38' downwardly, and this force will transfer to a downward force on the funnel arrangement 90. Alternatively, a person could grasp the funnel arrangement 90 directly, or a lever connected to the funnel arrangement 90, and pull down the funnel arrangement 90. The downward force on the funnel arrangement 90 transfers by way of the linkage assembly 120 to actuate the first pump 52 and second pump 70. Actuating the first pump 52 and second pump 70 conveys the first liquid from the vessel 40 and the second liquid from the bottle 68 into the mixing chamber 92, where it is mixed, and then flows by gravity to one of the wipes 38 as it moves from the upper funnel housing 94 to the dispensing funnel 96. Alternatively, a person could grasp a lever connected directly to the linkage assembly 120 to actuate the first pump 52.

Figure 15:
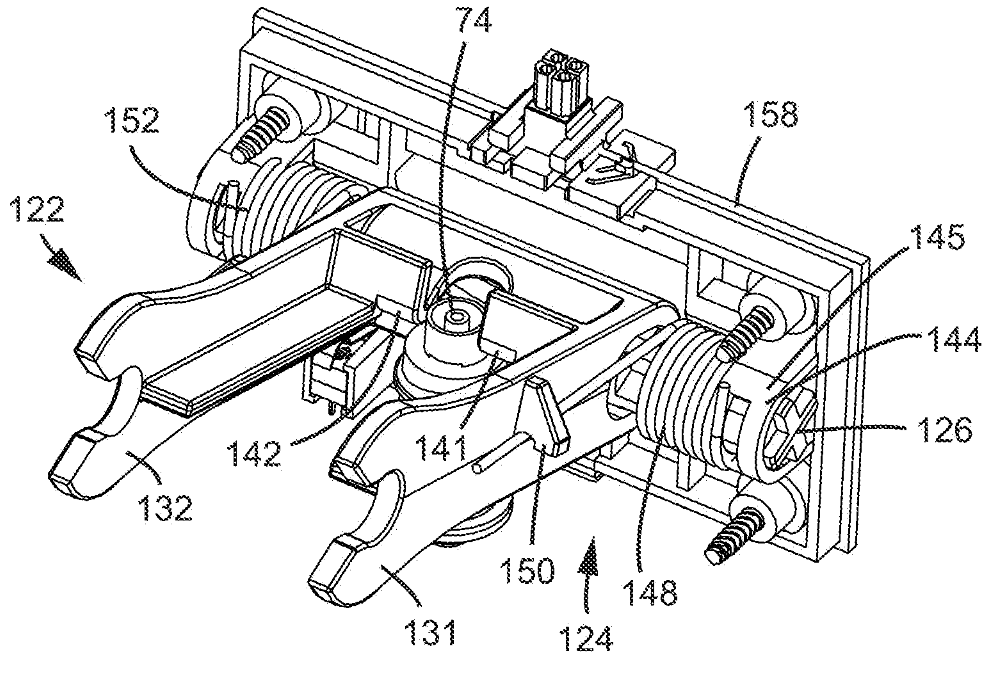
FIG. 15 is a perspective view of internal components of the linkage assembly of FIG. 14.
Figure 16:
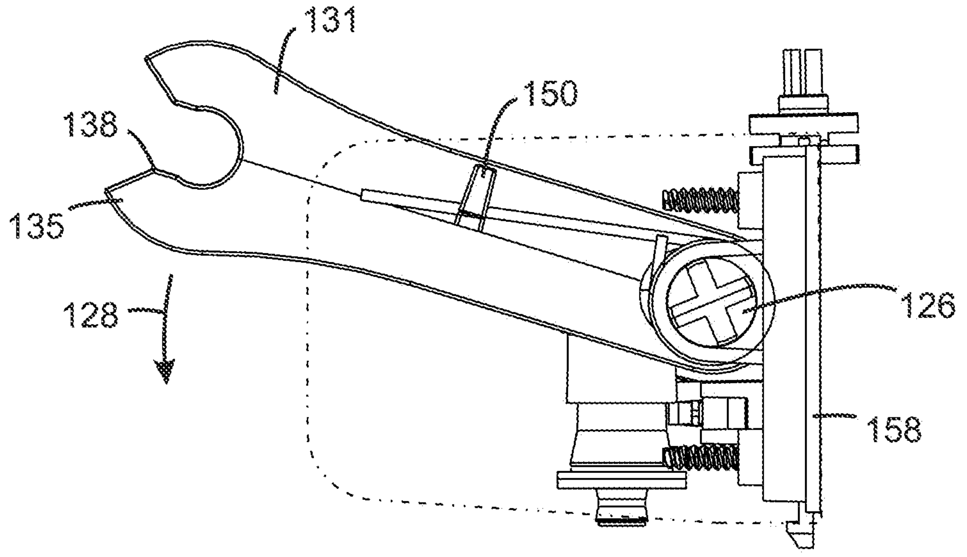
FIG. 16 is a side view of the linkage assembly of FIG. 15, shown in an idle position.

The linkage assembly 120 can be secured to the funnel arrangement 90 in a variety of fashions. In one example, the linkage assembly 120 includes an arm arrangement 122 (FIG. 18) and a spring arrangement 124 (FIG. 15). The arm arrangement 122 is pivotable between an idle and an actuating position and is biased by the spring arrangement 124 to the idle position. FIG. 16 illustrates the idle position, while FIG. 17 depicts the actuating position.

Figure 17:
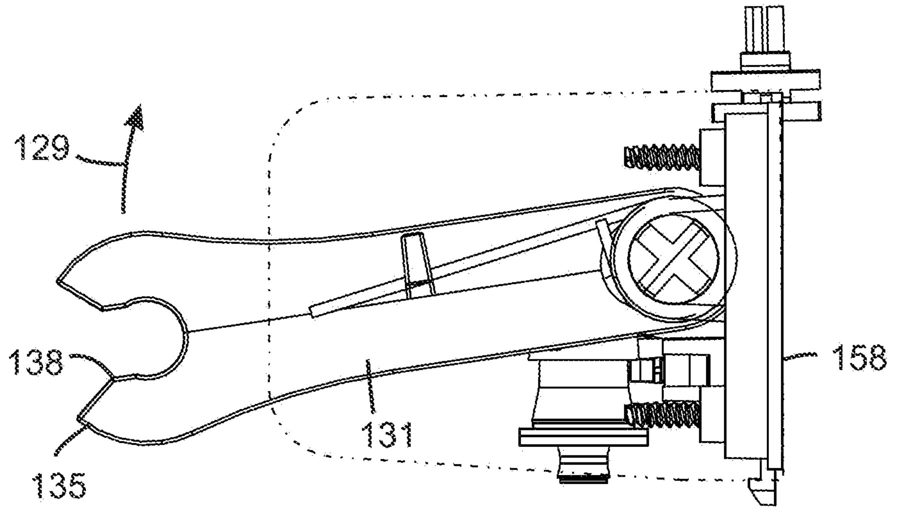
FIG. 17 is a side view of the linkage assembly of FIG. 15, shown in an actuating position.

The arm arrangement 122 is shown in FIGS. 16 and 17 as pivoting about an axis 126 which is along a line that is generally horizontal to the ground or bottom surface 49 of the vessel 40. FIG. 16 illustrates arrow 128 showing a direction of pivot downwardly, while FIG. 17 shows an arrow 129 showing a direction of pivot upwardly. The overall range of pivoting motion between the idle position of FIG. 16 and the actuated position of FIG. 17 is less than 90°, typically less than 60°, greater than 10°, and often between 15° and 50°.

In reference again to FIG. 18, the arm arrangement 122 includes a first arm 131 and a second arm 132. The first and second arms 131, 132 are spaced from each other by a base member 134 extending the first and second arms 131, 132. In this embodiment, the base member 134 extends between the ends of the arms 131, 132 that are at the pivot axis 126.

Each of the first and second arms 131, 132 has a respective free end 135, 136. Each of the free ends 135, 136 defines an open slot 138, 139 sized to removably receive and hold one of the first and second posts 114, 116 (FIG. 7) of the funnel arrangement 90.

The base member 134 of the arm arrangement 122 defines a second pump receiver 140. The second pump receiver 140 is generally centered between the first and second arms 131, 132 along the base member 134 and is sized to removably receive a portion of the second pump 70.

The base member 134 includes first and second shoulders 141, 142 on opposite sides of the receiver 140. The first and second shoulders 141, 142 engage against a portion of the second pump 70, such that when the arm arrangement 122 moves from the idle position (FIG. 16) to the actuating position (FIG. 17), the shoulders 141, 142 will press against the second pump 70 and cause liquid in the bottle 68 to be conveyed from the bottle 68, through the second pump 70, through the tubing 118, and to the mixing chamber 92 in the funnel arrangement 90.

In reference again to FIG. 15, the spring arrangement 124 includes a spring holder 144. The spring holder 144 is generally an elongated bar 145 which is mounted within an open passage 146 passing through the base member 134 (FIG. 8) of the arm arrangement 122. The spring holder 144 has an elongated longitudinal axis, which is generally colinear with the pivot axis 126.

Figure 18:
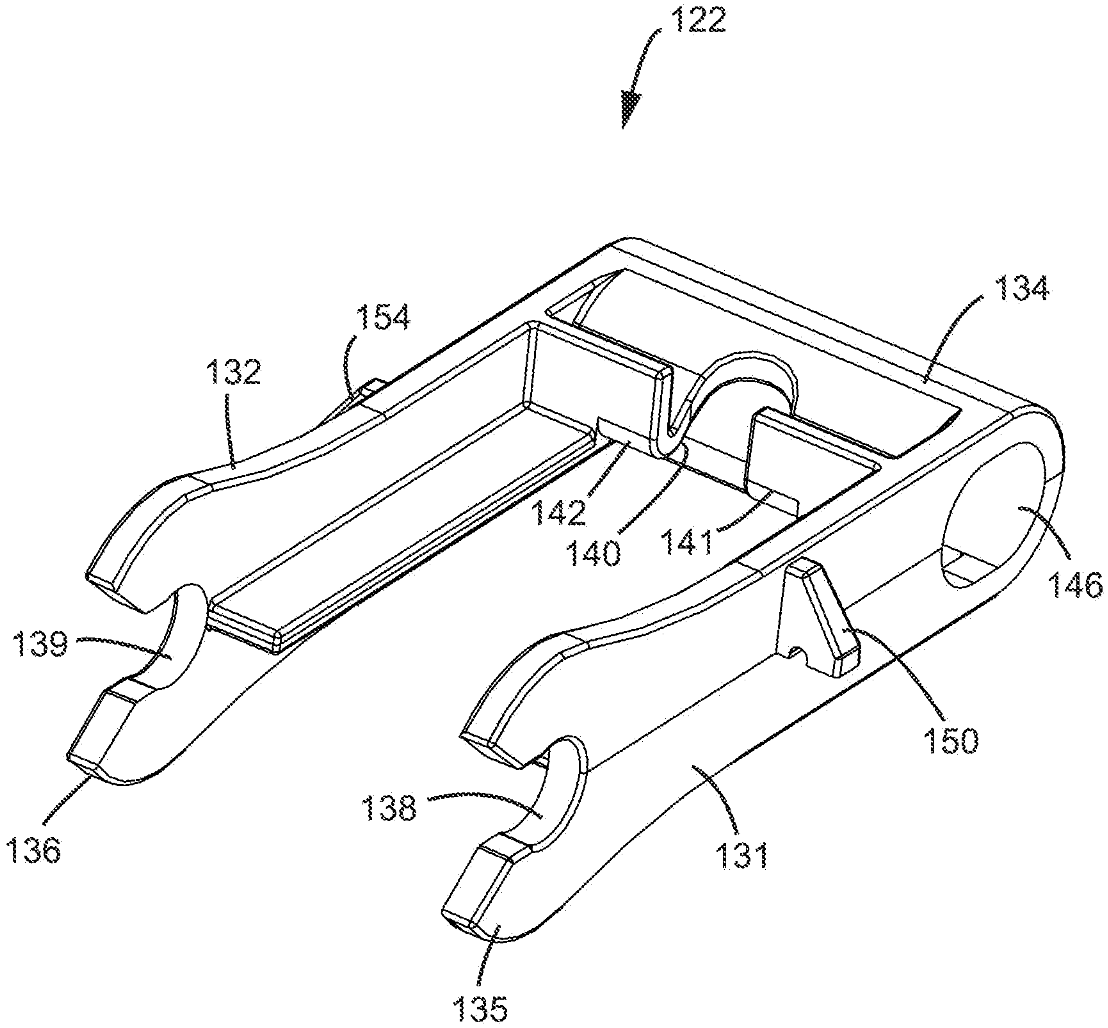
FIG. 18 is perspective view of an arm arrangement used in the linkage assembly of FIGS. 14 and 15.

A first spring 148 is mounted on the spring holder 144 and is connected to the first arm 131 at a tab 150 extending from the first arm 131. A second spring 152 is part of the spring arrangement 124 and is mounted on the spring holder 144. The second spring 152 is connected to the second arm 132 at a tab 154 (FIG. 18). The springs 148, 152 can have adjustable tensions such that, depending on the viscosities of the liquids to be dispensed, the strength of the springs 148, 152 can be controlled for either more or less resistance.

Figure 14:
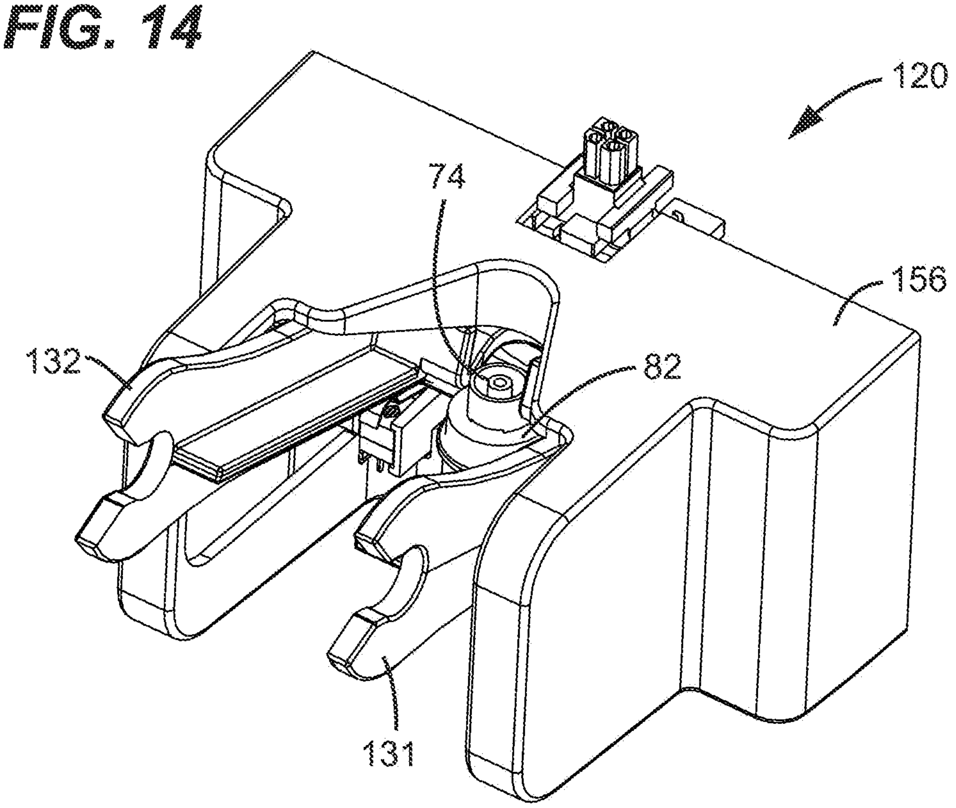
FIG. 14 is a perspective view of the linkage assembly depicted in FIGS. 11 and 12.

The arm arrangement 122 and spring arrangement 124 have components that are mounted within a linkage housing 156 (FIG. 14). The linkage housing 156, in general, covers the lateral portions of the arm arrangement 122 and covers the spring arrangement 124. A portion of the linkage housing 156 includes a mounting plate 158 (FIG. 15).

When the spring arrangement 124 moves the arm arrangement 122 back to the idle position, the arm arrangement 122 acts on the first pump 52 and the second pump 70 and reprimes them, by lifting them, in which internal components in the first pump 52 and second pump 70 are lifted to put the pumps 52, 70 in a primed position and ready for dispensing.

The arm arrangement 122 is movable along a stroke length, and the stroke length can be adjusted to control for a desired volume of first liquid and second liquid to be dispensed. The longer the stroke length, the more volume of first liquid from the first pump 52 and second liquid from the second pump 70 are dispensed. Another way of adjusting for the volume of liquids to be dispensed is by adjusting a position of a stop on the upper funnel housing 94 to limit the stroke length.

Figure 3:
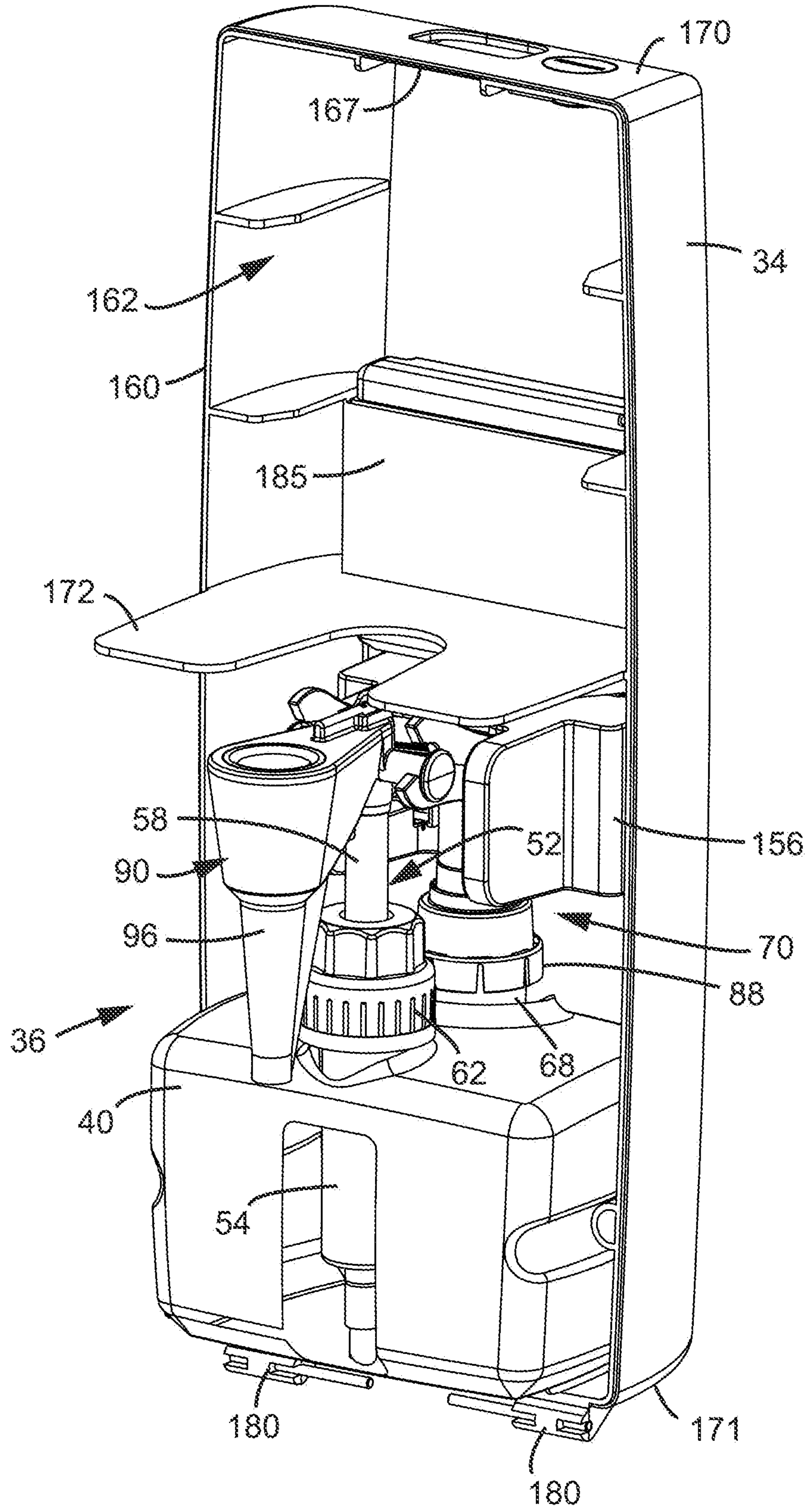
FIG. 3 is another exploded, perspective view of the dispenser of FIG. 1, showing the mixing and dispensing assembly positioned therein.

In reference again to FIGS. 1-3, the dispenser housing 34 has a surrounding wall 160 defining an interior volume 162. In FIG. 2, it can be seen how the housing 34 is openable to provide access to the interior volume 162. In the example shown, the housing 34 has a front portion 164 that is removable from the back portion 165. A tab 166 extends from the front portion 164 and is received by a receiver 167 in the back portion 165, such that the front portion 164 can be removed from (or pivoted away from) the back portion 165. A bottom 171 of the back portion 165 can be connected by a hinge assembly 180 to the front portion 164.

The housing 34 includes a wipe dispenser opening 168 through the wall 160, which is sized to permit a treated wipe 38' to be pulled therethrough.

The mixing and dispensing assembly 36 is removably and replaceably mounted within the interior volume 162. In FIG. 2, it can be seen how the funnel arrangement 90 is mounted in proximity to the opening 168, such that the dispensing funnel 96 has its opening in communication with the wipe dispenser opening 168 of the housing 34.

The back portion 165 of the housing 34 includes a top surface 170 opposite of the bottom surface 171. Within the interior volume 162 and spaced between the top surface 170 and bottom surface 171 is a shelf 172. The shelf 172 extends perpendicular to a backwall 173 and is constructed and arranged to hold a supply of the wipes 38 between the shelf 172 and the top surface 170 of housing 34. For example, when the wipes 38 are in the form of roll 39, the roll 39 can be positioned on the shelf 172 in a wipe storage volume 174. The mixing and dispensing assembly 36 can be oriented on an inner surface of the bottom surface 171 and below the shelf 172.

The system 30 may include an electronic module 185 (FIGS. 2 and 3) for sending a signal when the dispenser 32 is actuated and wipe 38 is removed from the dispenser 32. A calculation of the number of uses for when the servicing and replacement of the mixing and dispensing assembly 36 is warranted can take place either in the module 185, or in the cloud. The signal sent can relate to, for example, the number of times wipe 38 is grasped and removed from the dispenser 32. The module 185 can also detect whether the mixing and dispensing assembly 36 is in place in the housing 34. Based on the number of times the first pump 52 and second pump 70 are actuated by the linkage assembly 120, the module 185 can provide a notification for when servicing and replacement of the mixing and dispensing assembly 36 is warranted. One example useable module 185 is described in US 2018/0255981 assigned to Ecolab USA Inc. and incorporated by reference herein. The system 30 can also optionally use communication systems as described in U.S. Pat. Nos. 9,824,569; 8,564,431; and 8,872,665, each of which is incorporated herein by reference.

Example Method of Use

A method of applying a composition onto one of the wipes 38 is now described. The composition comprising the first liquid from the vessel 40 and the second liquid from the bottle 68 mixes in the mixing chamber 92 and drains by gravity to the dispensing funnel 96, wicks onto the wipe 38, while constriction at outlet end 97 helps to wring out the wetted wipe 38' as it is pulled from the funnel 96 to distribute the composition along the wipe 38. In many cases an upper portion, such as the upper 1 inch, of the wipe 38 remains unwetted initially, and the rest of the wipe 38 then wipes or wicks the internal flow path of the dispensing funnel 96 dry as it passes along the flow path. A portion of the wipe 38 may never come in contact with the liquid and may remain mostly dry, but efficacy is not impacted as the portion of the wipe 38 that is wet is sufficiently effective.

The treated wipe 38' is removed from the dispensing funnel 96, such as by tearing or separating the treated wipe 38' from the remaining supply of wipes 38.

In operation, a method of using the dispenser 32 includes grasping a portion of the wipe 38' through the wipe dispenser 168 in the housing 34 and pulling the wipe 38' downwardly. By pulling the wipe 38' downwardly, this pulls down the funnel arrangement 90, which actuates the first pump 52 and the second pump 70. Actuating the first pump 52 and second pump 70 conveys a consistent amount/dose of both the first liquid from the vessel 40 and second liquid form the bottle 68, to the mixing chamber 92 to mix together in the funnel arrangement 90. The mixed first liquid and second liquid drain by gravity to the interior of the dispensing funnel 96, where it will wet the wipe 38 present in the dispensing funnel 96. When the treated wipe 38 is torn off from a remaining portion of the roll 39 of wipes 38, the funnel arrangement 90 will be returned to an idle position, in which the pumps 52, 70 are not actuated.

The step of actuating the first pump 52 and second pump 70 preferably take place simultaneously. This is done by moving the linkage assembly 120 from the idle position to an actuating position. The linkage assembly 120 ensures that a consistent dose/amount/proportion of the first liquid and second liquid are delivered to the wipe 38, every time a new wipe 38 is grasped. When the funnel arrangement 90 is pulled downwardly, this pivots the arm arrangement 122 downwardly against the spring arrangement 124, and the arm arrangement 122 actuates the first pump 52 and second pump 70.

At some point, the first liquid in the vessel 40 and second liquid in the bottle 68 will become exhausted or expired. At that point, the system 30 must be serviced. The system 30 can be serviced by opening the housing 34, removing the mixing and dispensing assembly 36 from the housing 34, and replacing the mixing and dispensing assembly 36 with a new mixing and dispensing assembly 36 having the vessel 40 filled and the bottle 68 filled. Alternatively, only the vessel 40 and/or bottle 68 can be replaced, and/or refilled and re-used. In some cases, the module 185 can be used to inform the user (directly or via the cloud) that the system 30 should be serviced, or is getting close to needing servicing, by replacement of the assembly 36, because the module 185 has sent a signal each time the pumps 52, 70 are activated.

Periodically, the supply of wipes 38 will need replacement. The housing 34 is opened, and a new supply of wipes 38, such as wipes in the roll 39 is provided and positioned within the wipe storage volume 174 on the shelf 172.

Another Example Embodiment, FIGS. 19-30

FIGS. 19-29 illustrate another example embodiment. Where appropriate, like parts have the same reference number, and the description of those parts is not again repeated, but rather, is incorporated herein by reference.

Figure 19:
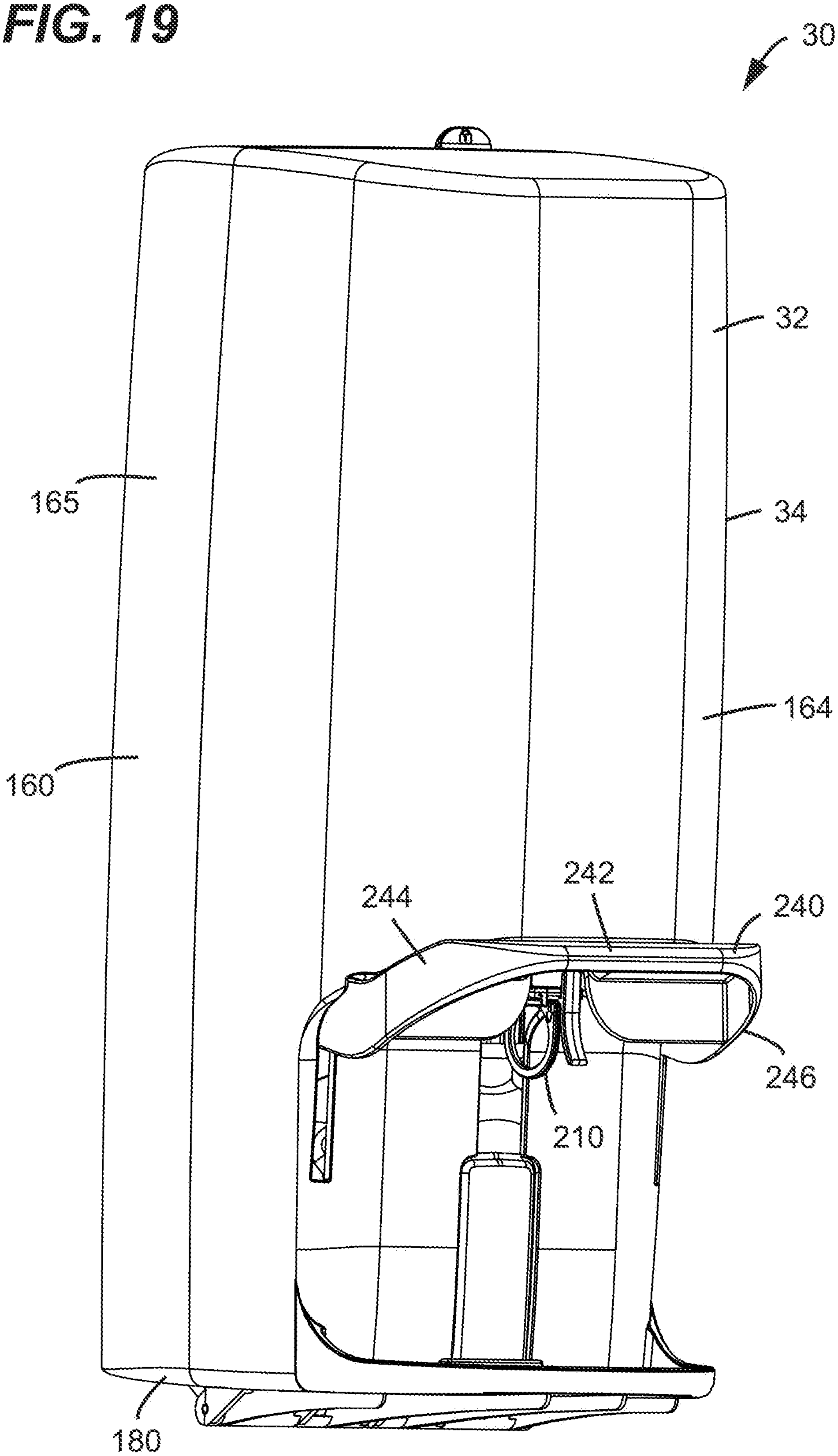
FIG. 19 is a perspective view of another embodiment of a dispenser for wipes, constructed in accordance with principles of this disclosure.
Figure 20:
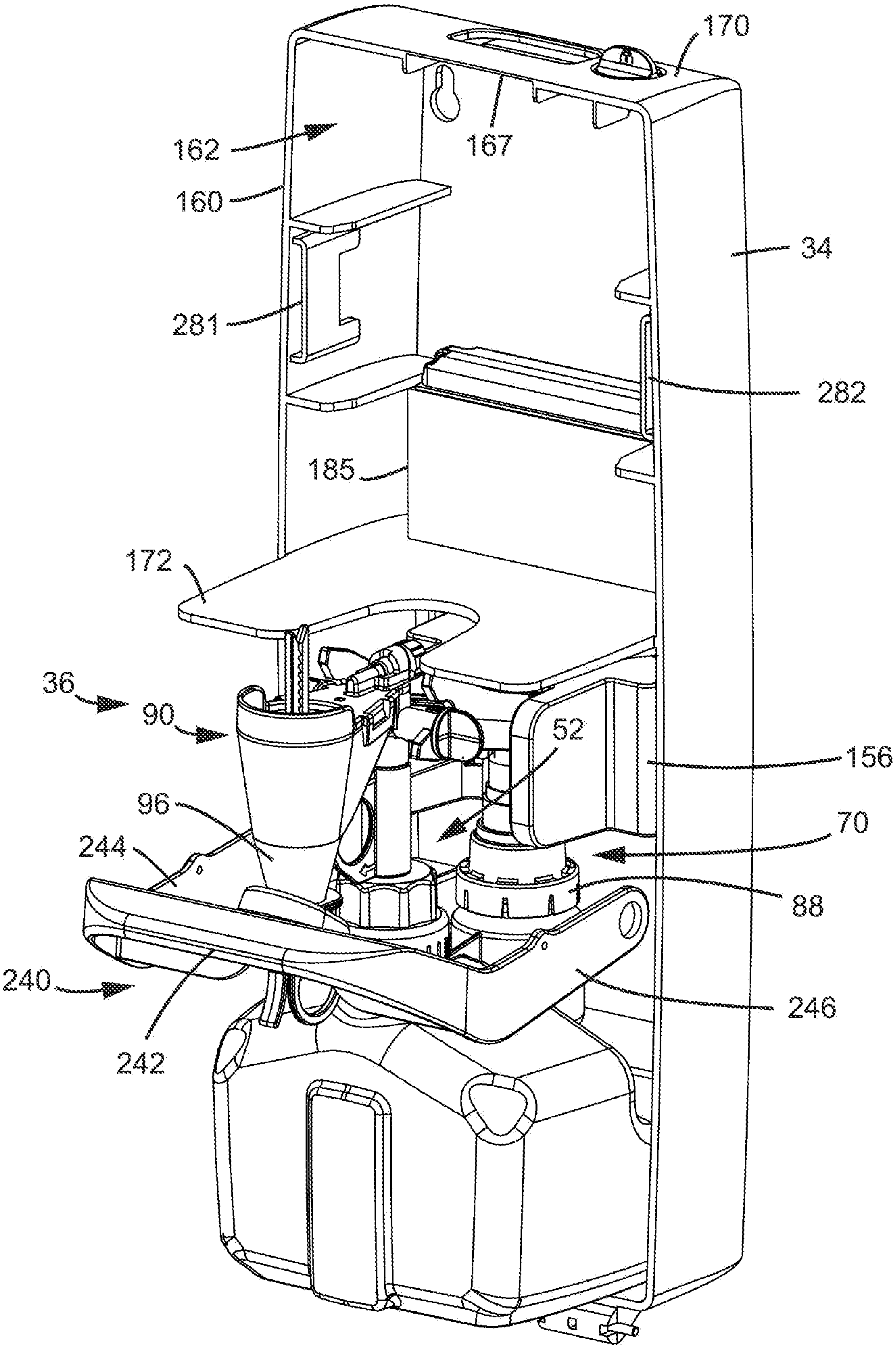
FIG. 20 is a perspective view of the dispenser for wipes of FIG. 19, with certain components removed, to show internal components including a mixing and dispensing assembly positioned therein.
Figure 21:
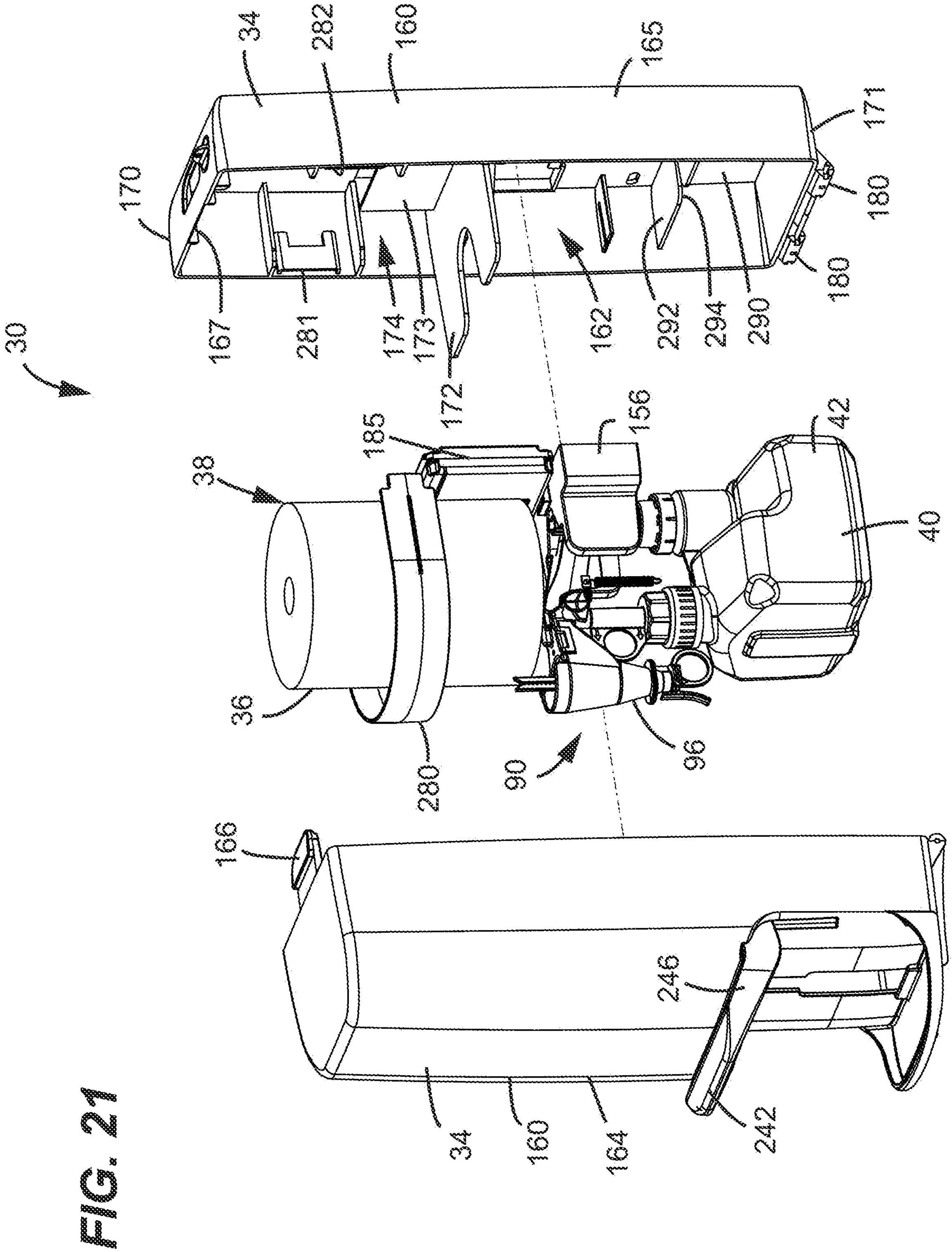
FIG. 21 is an exploded perspective view of the dispenser for wipes of FIG. 19.
Figure 22:
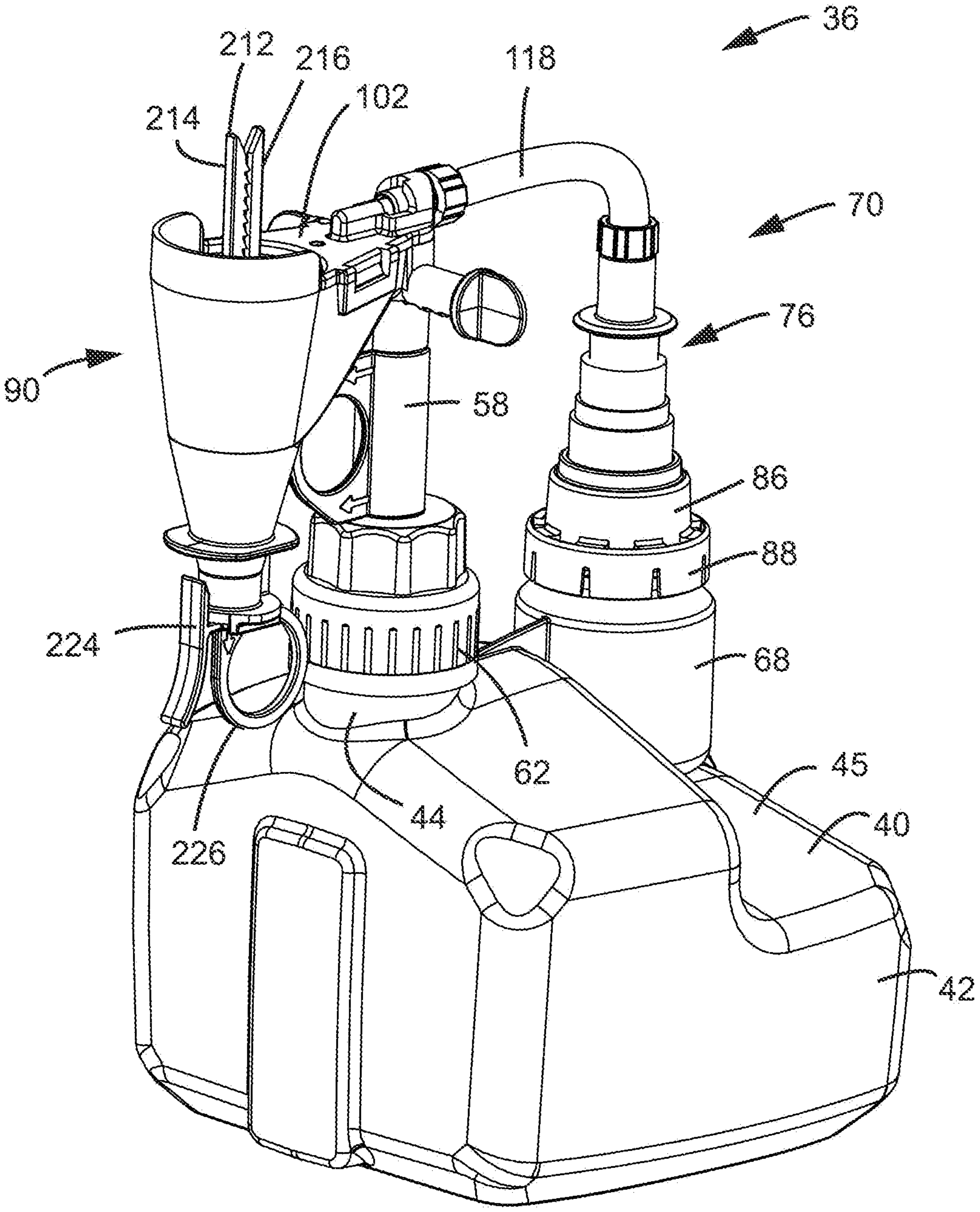
FIG. 22 is a perspective view of the mixing and dispensing assembly used in the dispenser of FIG. 20.
Figure 27:
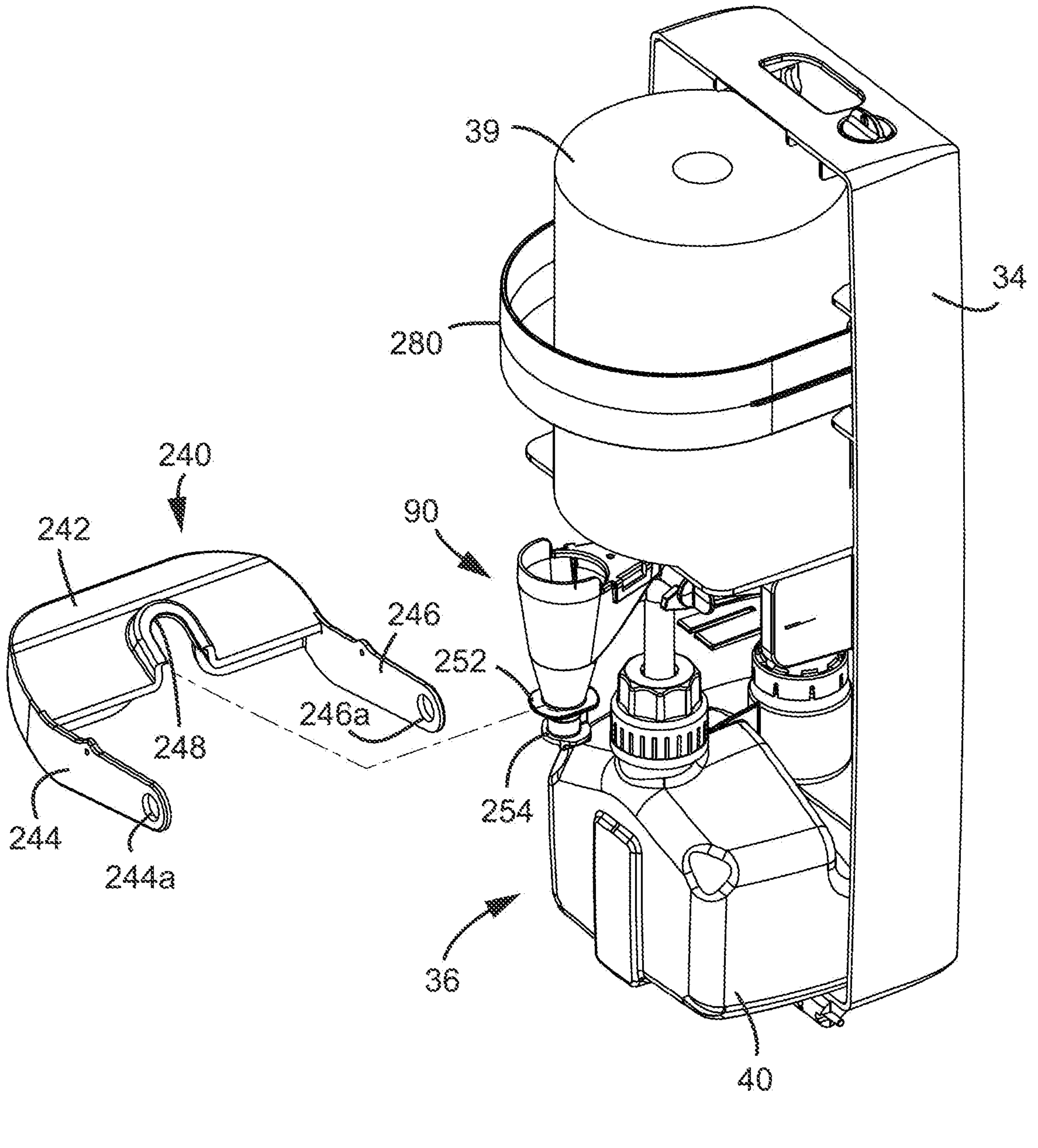
FIG. 27 is a perspective view of the dispenser for wipes of FIG. 19, with certain components removed, to show internal components including the wipe supply, and showing push bar exploded therefrom.
Figure 28:
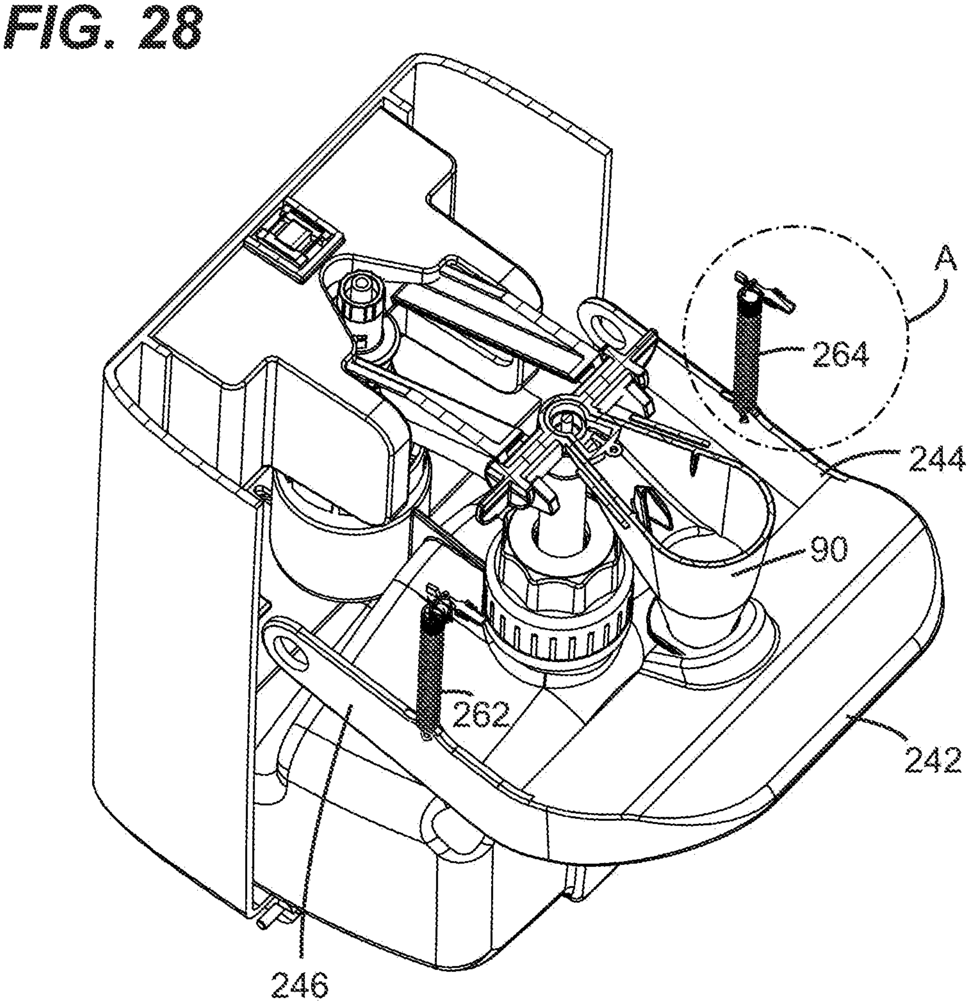
FIG. 28 is a perspective view showing only portions of the dispenser of FIG. 19.
Figure 28A:
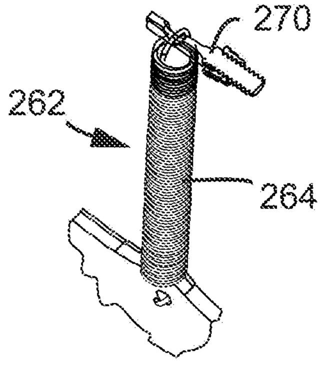

FIG. 19 shows system 30 including dispenser 32, having housing 34, a removable and replaceable mixing and dispensing assembly 36, and a supply of wipes 38 (FIG. 27)

The mixing and dispensing assembly 36 is shown in FIGS. 22-26. The assembly 36 has vessel 40 with surrounding wall 42 defining an interior volume 43 therewithin. The interior volume 43 is used to store a first liquid, such as one liquid used for application to wipes 38. The vessel 40 has at least a first opening 44 in communication with the interior volume 43.

First pump 52 is within the first opening 44 and oriented to convey the first liquid stored within the interior volume 43. In this embodiment, the first pump 52 includes a spring 104 to assist in priming the first pump 52.

Bottle 68 having the second pump 70 is oriented to convey a second liquid stored within the bottle 68. In this embodiment, the vessel 40 and the bottle 68 are a single unitary member. By "single unitary member," it is meant that they can be two separate members that are one or more of: mated, attached, secured, clipped, fastened or fitted together; or they can be molded as a single piece. In one example, the vessel 40 is molded to have a receiver (holder) for the bottle 68, and the bottle 68 is clipped/fastened/secured to the vessel 40.

Funnel arrangement 90 is in downstream communication with the first pump 52 and second pump 70. The funnel arrangement 90 includes open end 91 sized to receive a wipe 38 and a mixing chamber 92 in communication with the first pump 52 and second pump 70. The funnel arrangement 90 is constructed and arranged to mix the first liquid and second liquid.

The funnel arrangement 90 includes dispensing portion or funnel 96 downstream of the mixing chamber 92, wherein a wipe 38 can be pulled through the dispensing portion 96 and wetted with a mixture of the first liquid and second liquid from the mixing chamber 92. The dispensing portion/funnel 96 is a single unitary molded member with the upper funnel housing 94 of FIG. 9.

The funnel arrangement 90 is preferably designed so that the outlet tapers down to pinch around the tail of the wipe 38. The taper provides sealing between the wipe 38 during the liquid dispense. Secondly, when the wipe 38 is pulled through the taper in the funnel arrangement 90, the liquid in the funnel arrangement 90 is pressed/squeezed into the wipe 38 as it pulls through the funnel arrangement 90. The taper assists in providing friction in the subsequent dry wipe to tear off at the perforation of the wipe 38.

The funnel arrangement 90 can further include cap 102 over the open end 91 including a wipe supply opening 105 constructed and arranged to receive a supply of wipes. The cap 102 further has a first port 106 in communication with the first pump 52 and the mixing chamber 92; and a second port 108 in communication with the second pump 70 and the mixing chamber 92.

Figure 30:
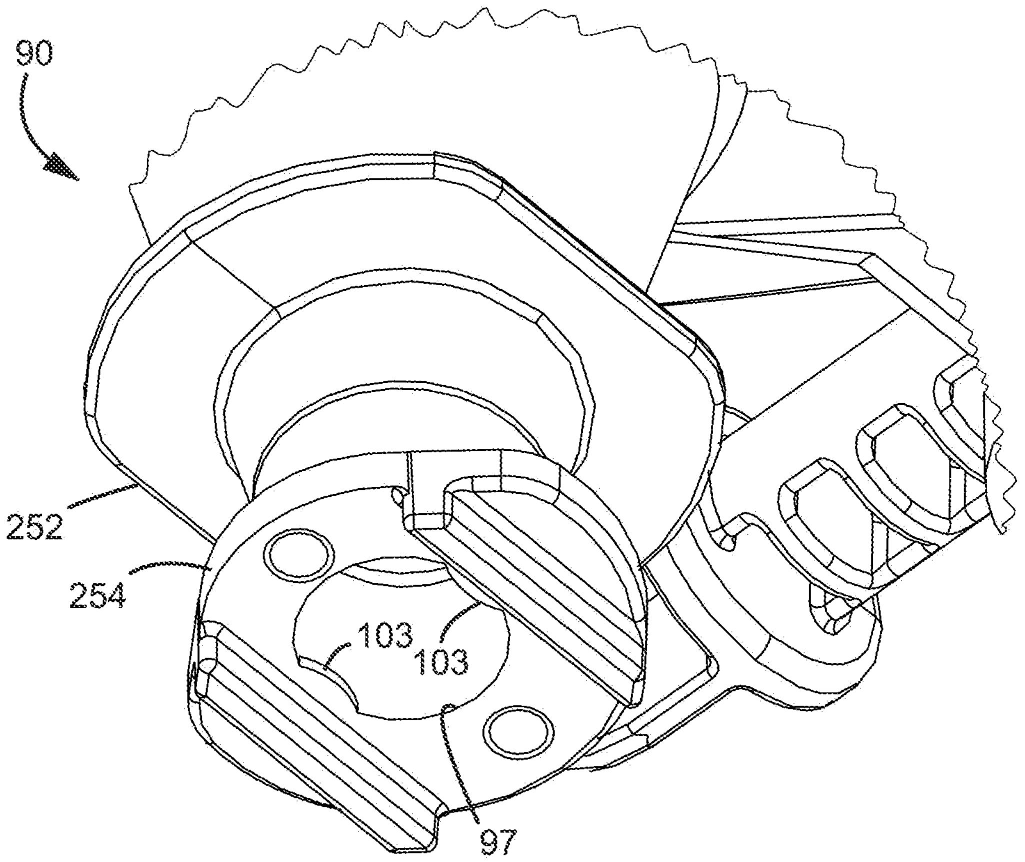
FIG. 30 is a bottom perspective view of a funnel arrangement, used in the mixing and dispensing assembly of FIG. 22.

FIG. 30 is a bottom perspective view of the funnel arrangement 90. The outlet opening 97, which the wipe 38 passes through, is shown on a bottom face. Along an inner perimeter rim of the opening 97, a pair of opposing rounded projections or ears 103 is visible. The ears 103 provide additional friction on the subsequent wipe 38 and dually assist in tearing the wipe perforation. These ears 103 help to reduce or eliminate roping of wipes 38.

The mixing chamber 92 includes internally mounted splitter 110 to facilitate mixing of the first liquid and second liquid. The mixing chamber 92 has sloped wall 111 sloping downwardly away from the first and second ports 106, 108 and toward the dispensing portion 96. In this embodiment, the splitter 110 is within the mixing chamber 92 and mounted along the sloped wall 111.

As can also be seen in this embodiment, the funnel arrangement 90 includes a pair of axially spaced and radially outward protruding ribs 252, 254. The ribs 252, 254 engage a portion of a push bar 240, explained below.

Figure 23:
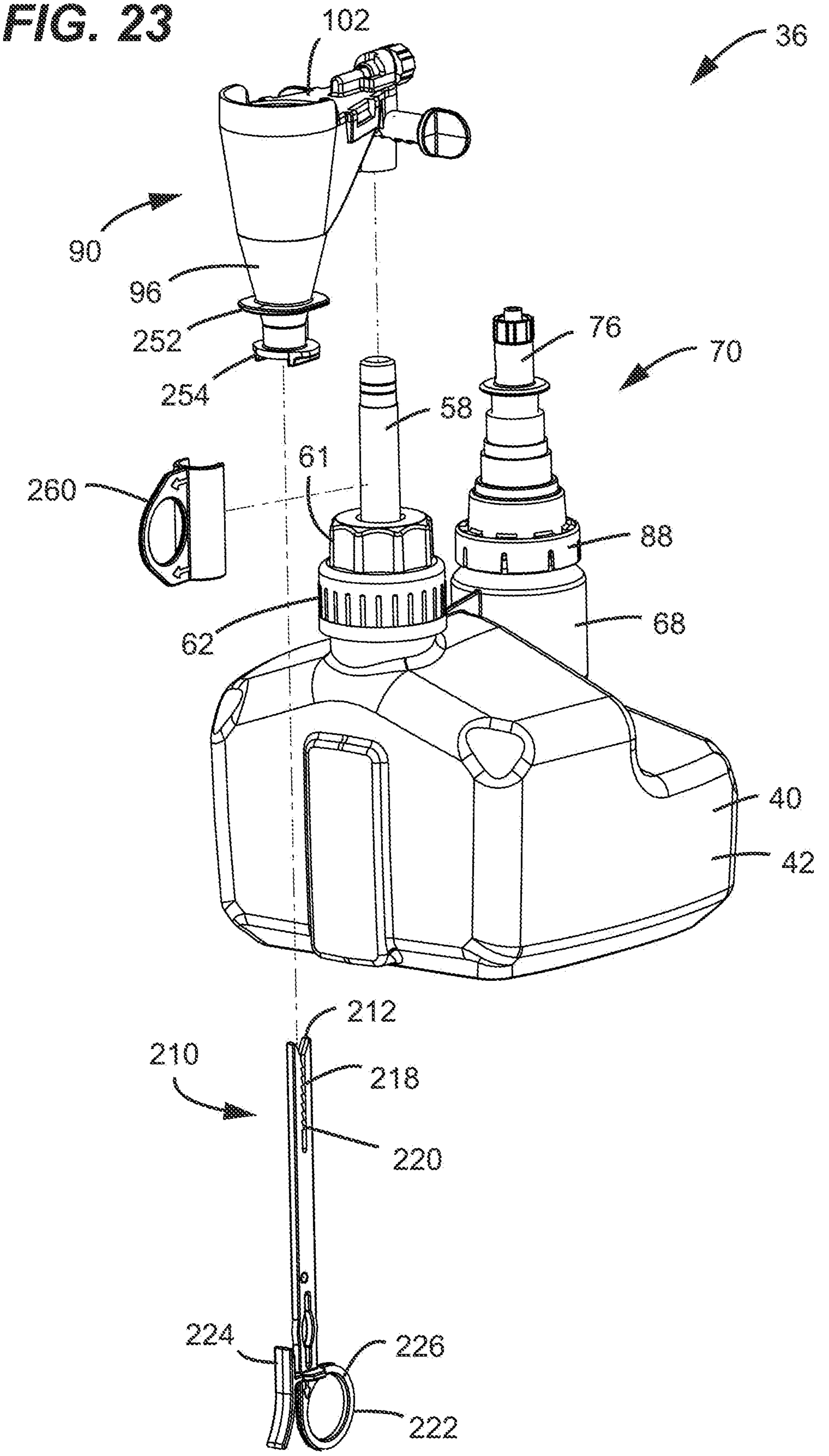
FIG. 23 is an exploded perspective view of the mixing and dispensing assembly of FIG. 22.
Figure 24:
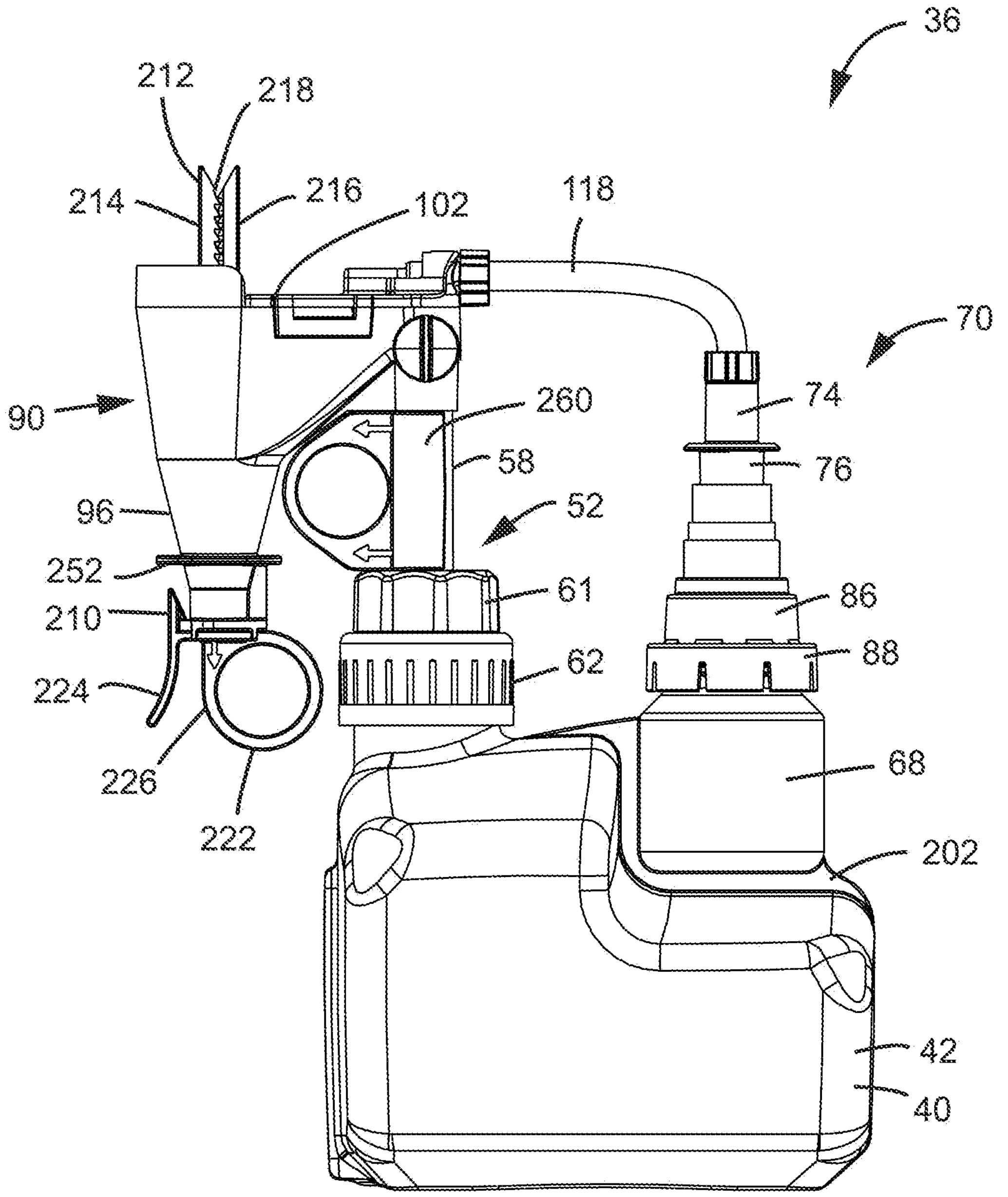
FIG. 24 is a side view of the mixing and dispensing assembly of FIG. 22.
Figure 25:
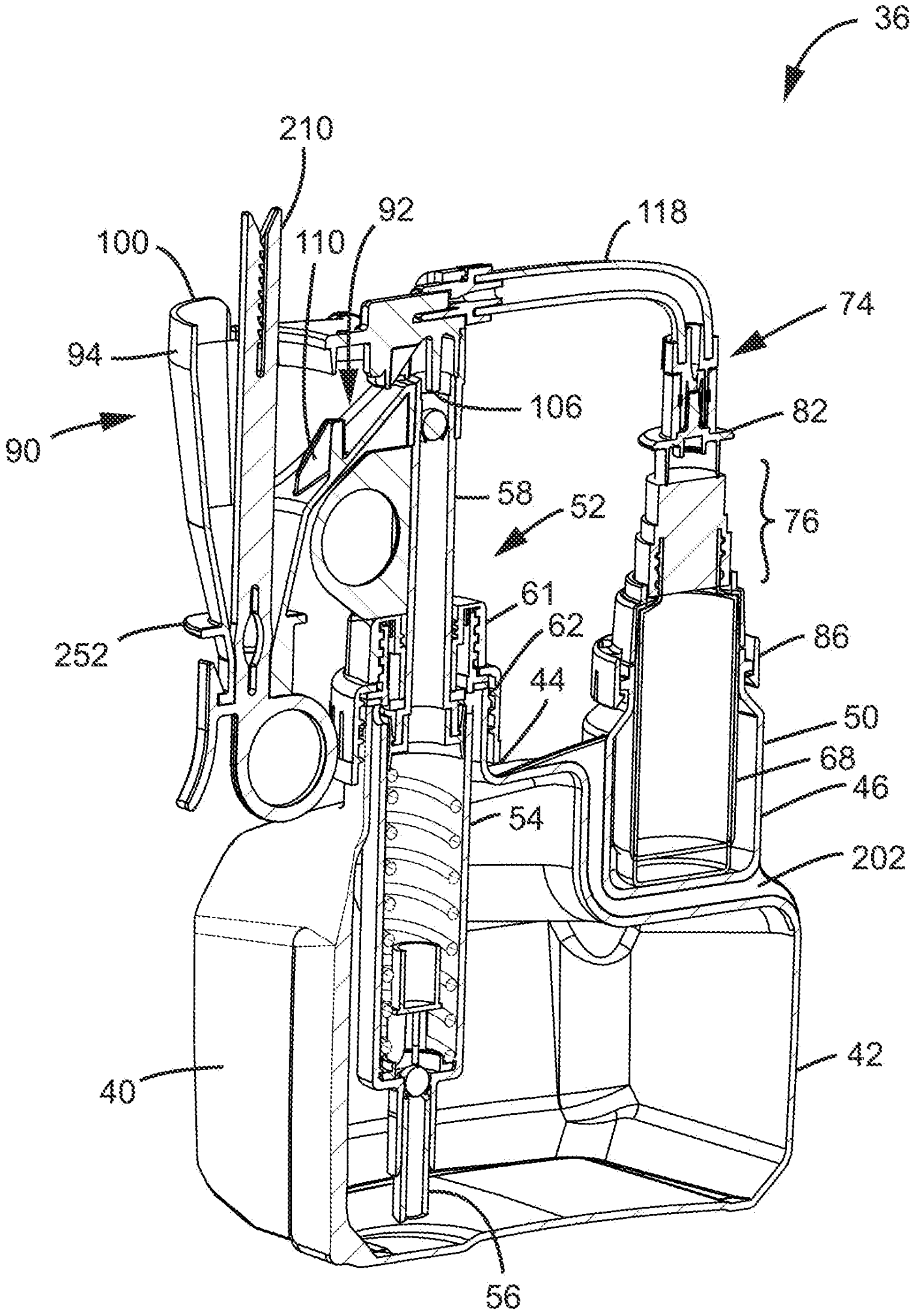
FIG. 25 is a cross-sectional, perspective view of the mixing and dispensing assembly of FIG. 22.

In FIG. 23, a removable lock piece 260 is removably placed on slide tube 58. The lock piece 260 prevents actuation of the pumps 52, 70 during storage or shipping, and before it is intended to use the assembly 36. When use is intended, the user removes the lock piece 260 from the slide tube 58, and disposes of the lock piece 260.

In this embodiment, there is a fin 202 (FIG. 24) between the vessel 40 and the bottle 68. As explained below, the fin 202 is received within an opening in a ledge 292 projecting from a backwall 290 of the housing 34.

As shown in FIGS. 22-26, the mixing and dispensing assembly 36 includes tubing 118 connecting the bottle 68 to the mixing chamber 92.

In reference now to FIGS. 23-26, the mixing and dispensing assembly 36 further includes a removable wipe threading or starter tool 210. The starter tool 210 is removably positioned within the funnel arrangement 90. The starter tool 210 is used to initially thread the lead wipe 38 through the funnel arrangement 90 and position the lead wipe 38 for grasping and use.

Figure 26:
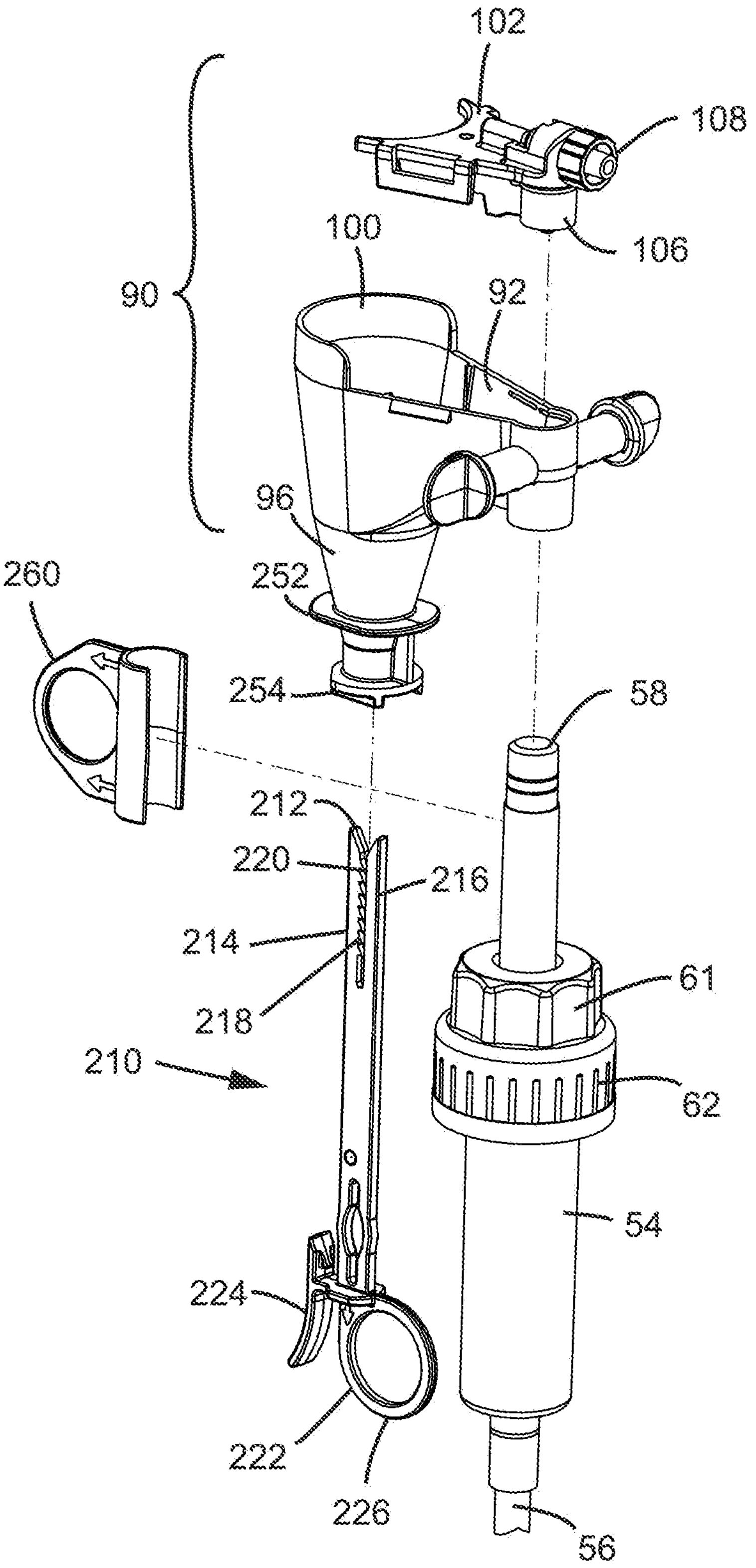
FIG. 26 is an exploded perspective view of some parts of the mixing and dispensing assembly of FIG. 22.

While many different arrangements are possible, in the example embodiment shown, the wipe starter tool 210 includes a nose 212 at one terminal end of the tool 210. The nose 212 has opposing jaws 214, 216 defining an elongated slot 218 therebetween. The jaws 214, 216 have opposing teeth 220 along the slot 218. A handle 222 is positioned on an end opposite of the nose 212. The handle 222 has a thumb rest 224 and an open finger ring 226. In FIG. 26, it can be seen how an end 224' of the thumb rest 224 is pivotably and removably connected to a portion of the funnel arrangement 90, and in the example shown, the protruding rib 254.

The dispenser 32 includes the mixing and dispensing assembly 34 and linkage assembly 120 secured to the funnel arrangement 90, the first pump 52, and the second pump 70. When a force is applied to the funnel arrangement 90, the linkage assembly 120 transfers the force to actuate the first pump 52 and second pump 70.

In this embodiment, the dispenser 32 further includes a push bar 240. The push bar 240 is operatively attached to the funnel arrangement 90 to selectively apply the force to the funnel arrangement 90 and the linkage assembly 120, which thereby transfers the force to actuate the first pump 52 and second pump 70.

Figure 29:
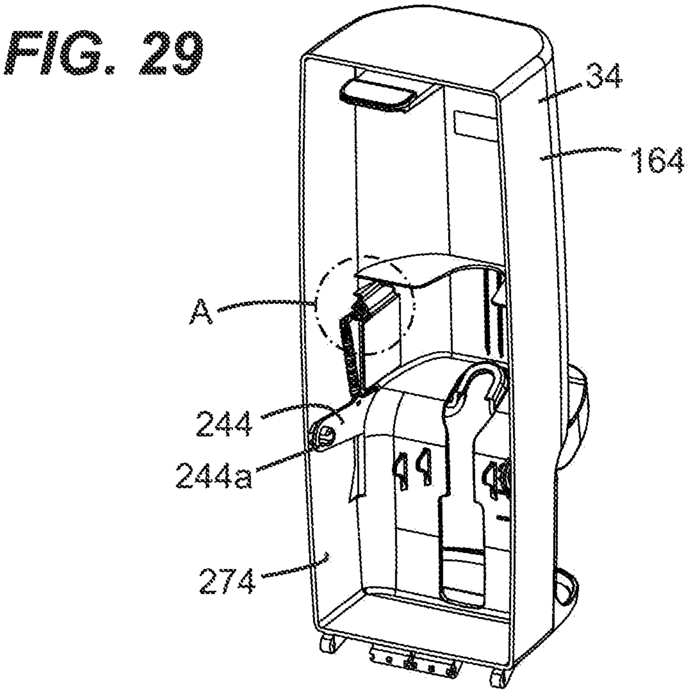
FIG. 29 is a perspective view of part of a housing for the dispenser of FIG. 19.
Figure 29A:
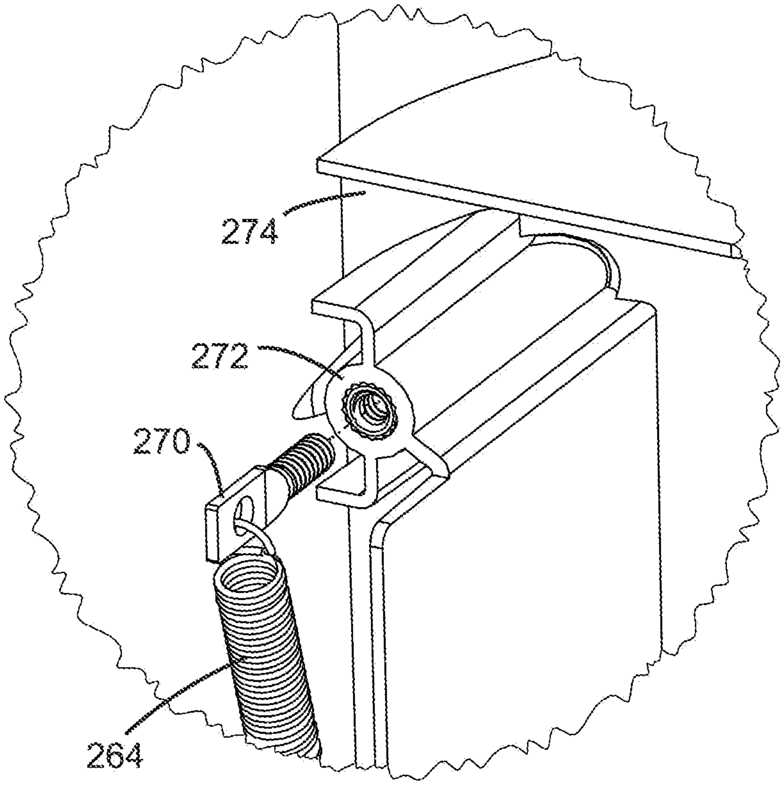
FIG. 29A is an enlarged view of portion A of FIG. 29.

As shown, the push bar 240 is pivotably attached to the housing 34. In the example embodiment shown, the push bar 240 includes a handle or push member 242 extending between a pair of arms 244, 246. The push member 242 has an open slot 248, interacting with the funnel arrangement 90. As mentioned previously, and as depicted in FIG. 27, it can be seen how the funnel arrangement 90 includes a pair of axially spaced and radially outward protruding ribs 252, 254. The open slot 248 receives the funnel arrangement 90 between the protruding ribs 252, 254. Ends of the arms 244, 246 have openings **244*a*, 246*a* which are received by bosses or other fasteners in the front housing 164 (FIG. 29**).

As can be seen in FIGS. 28, 28A, 29, and 29A, a biasing arrangement 262 is positioned between the push bar 240 and the housing 34. In the example shown, the biasing arrangement 262 is a spring 264. The spring 264 is attached to the push bar 240 and to an interior portion of the front portion 164 of the housing 34. One end of the spring 264 is attached to a threaded fastener 270, which is threadably attached to a boss 272 in the interior surface 274 of the front portion 164 of the housing 34. The other end of each of the springs 264 is secured to each of the arms 244, 246.

The surrounding wall 160 of the dispenser housing 34 defines interior volume 162. The housing 34 is openable to provide access to the interior volume 162. The housing defines a wipe dispenser 32 opening through the wall 160 sized to permit a treated wipe 38 to be pulled therethrough. The mixing and dispensing assembly 34 is removably and replaceably mounted within the interior volume 162.

The housing 34 further includes a flexible band 280 secured to the housing interior 162 and sized to hold the supply of wipes 38 in the wipe storage volume 174. The band 280 can be releasably secured to receivers 281, 282 in the housing 34.

The housing further 34 includes a backwall 290 and a ledge 292 projecting perpendicular from the backwall 290 into the interior volume 162. The ledge 292 has an open gap 294. The fin 202 between the vessel 40 and bottle 68 is received within the open gap 294 of the ledge 292.

This embodiment can be used in a method of using a wetting dispenser 34 for wipes. The method includes actuating first pump 52 in a housing, which conveys a first liquid to chamber 92; and allowing the first liquid to wet a portion of a wipe 38 within a funnel arrangement 90.

The step of actuating a first pump 52 includes using a lever to pull down the funnel arrangement 90, which actuates the first pump 52. The step of using a lever includes pushing down a push bar 240 operatively connected to the funnel arrangement 90.

The method of using a wetting dispenser 34 for wipes can also include applying a force to pull down funnel arrangement 90 and actuate a first pump 52 and a second pump 70, which conveys a first liquid and a second liquid to mixing chamber 92 to mix in the funnel arrangement 90; and allowing the mixed first liquid and second liquid to wet a portion of wipe 38 extending through wipe dispenser 32 in housing 34.

The step of applying a force includes pressing down on a push bar 240, the push bar 240 being operatively connected to the funnel arrangement 90.

Another Example Embodiment, FIGS. 31-34

FIGS. 31-34 illustrate another example embodiment. Where appropriate, like parts have the same reference number, and the description of those parts is not again repeated, but rather, is incorporated herein by reference.

FIGS. 31-34 shows a system 300 including a dispenser 302, having a housing 304 and removable and replaceable mixing and dispensing assembly 306. In this embodiment, the example system is "wipeless". By "wipeless", it is meant that wipes 38 are not positioned to be pulled through the funnel arrangement 90 to be treated with liquid applied while being pulled through the funnel arrangement 90. Rather, in this system 300, liquids are mixed (if more than one liquid is used) and then dispensed into either a collection tray 305, or directly onto a wipe 38 or towel placed under a liquid dispenser (e.g., outlet 97 of the funnel arrangement 90) of the liquids. It should be noted that a supply of wipes 38 can be provided by the dispenser 302, but the wipes 38 are not treated with the liquid by passing through the funnel arrangement 90.

The mixing and dispensing assembly 306 is constructed analogously to the assembly 36 shown in FIGS. 22-26 (and reference is made to those FIGS., in connection with this FIG. 31-34 embodiment), except for having the wipes 38 pass through the funnel arrangement 90. As such, the assembly 306 has vessel 40 with surrounding wall 42 defining an interior volume 43 therewithin. The interior volume 43 is used to store a first liquid, such as one liquid used for application to wipes 38. The vessel 40 has at least a first opening 44 in communication with the interior volume 43.

First pump 52 is within the first opening 44 and oriented to convey the first liquid stored within the interior volume 43. The first pump 52 includes spring 104 to assist in priming the first pump 52.

Bottle 68 having the second pump 70 is oriented to convey a second liquid stored within the bottle 68.

Funnel arrangement 90 is in downstream communication with the first pump 52 and second pump 70. The funnel arrangement 90 includes open end 91 and a mixing chamber 92 in communication with the first pump 52 and second pump 70. The funnel arrangement 90 is constructed and arranged to mix the first liquid and second liquid.

The funnel arrangement 90 includes dispensing portion (i.e., "dispenser" 96) downstream of the mixing chamber 92, wherein a mixture of the first liquid and second liquid from the mixing chamber 92 can flow therethrough. The dispenser 96 can be a single unitary molded member with the upper funnel housing 94 of FIG. 9

Figure 31:
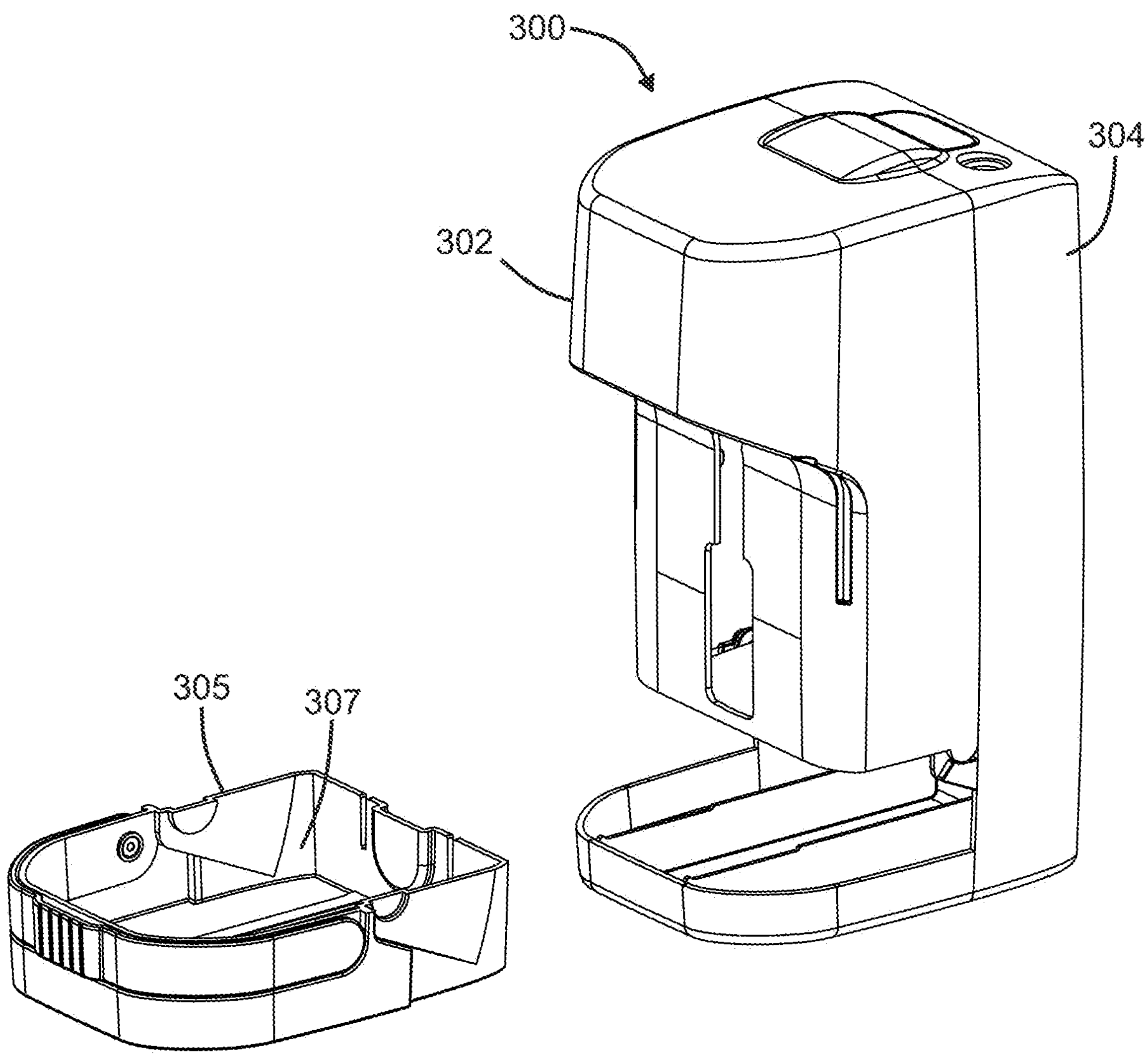
FIG. 31 is an exploded perspective view of portions of another embodiment of a dispenser, including a removable tray removed from a remaining part of the dispenser.
Figure 32:
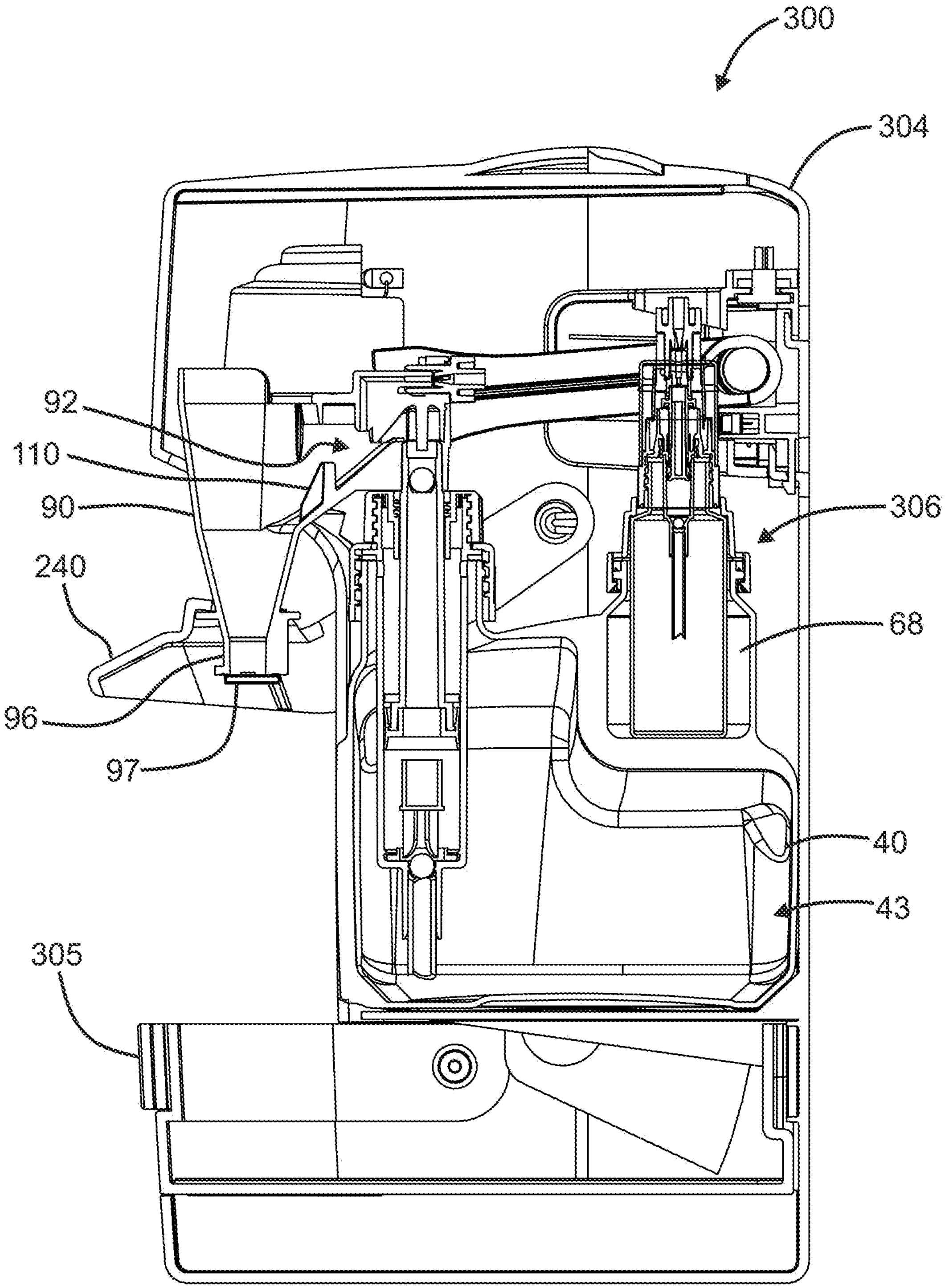
FIG. 32 is a cross-sectional, perspective view of the dispenser of FIG. 31, in an actuated position.

In FIG. 31, collection or catch tray 305 is positioned below the dispenser 96 to catch or collect the mixture from the dispenser 96. The tray 305 is constructed to have an open basin 307 for holding and containing the dispensed liquid. The tray 305 can be preferably designed to slidably or removably attach to the housing 304 underneath the dispenser 96. A wipe 38 or towel can then be dipped into the liquid mixture in the tray 305. Alternatively, the wipe 38 or towel can be placed directly under the dispenser 96 to apply the liquid onto the wipe or towel. The tray 305 is removable so that it can be removed from the housing and carried away with the mixed liquids and/or with the wipe 38 or towel soaked with the mixed liquids to another location.

The funnel arrangement 90 can include cap 102 over the open end 91 including a first port 106 in communication with the first pump 52 and the mixing chamber 92; and a second port 108 in communication with the second pump 70 and the mixing chamber 92.

The mixing chamber 92 includes internally mounted splitter 110 to facilitate mixing of the first liquid and second liquid. The mixing chamber 92 has sloped wall 111 sloping downwardly away from the first and second ports 106, 108 and toward the dispenser 96. The splitter 110 is within the mixing chamber 92 and mounted along the sloped wall 111.

The funnel arrangement 90 includes axially spaced and radially outward protruding ribs 252, 254. The ribs 252, 254 engage a portion of push bar 240.

The dispenser 302 includes the mixing and dispensing assembly 304 and linkage assembly 120 (FIG. 14) secured to the funnel arrangement 90, the first pump 52, and the second pump 70. When a force is applied to the funnel arrangement 90, the linkage assembly 120 transfers the force to actuate the first pump 52 and second pump 70.

The dispenser 302 further includes push bar 240. The push bar 240 is operatively attached to the funnel arrangement 90 to selectively apply the force to the funnel arrangement 90 and the linkage assembly 120, which thereby transfers the force to actuate the first pump 52 and second pump 70.

The surrounding wall 160 of the dispenser housing 304 defines interior volume 162. The housing 304 is openable to provide access to the interior volume 162. The mixing and dispensing assembly 304 is removably and replaceably mounted within the interior volume 162.

This embodiment can be used in a method of using a wetting dispenser 304 for wipes. The method includes: applying a force to pull down the funnel arrangement 90 and actuate first pump 52 and second pump 70, which conveys a first liquid and a second liquid to mixing chamber 92 to mix in the funnel arrangement 90; and then allowing the mixed first liquid and second liquid to dispense downstream of the funnel arrangement 90.

Figure 33:
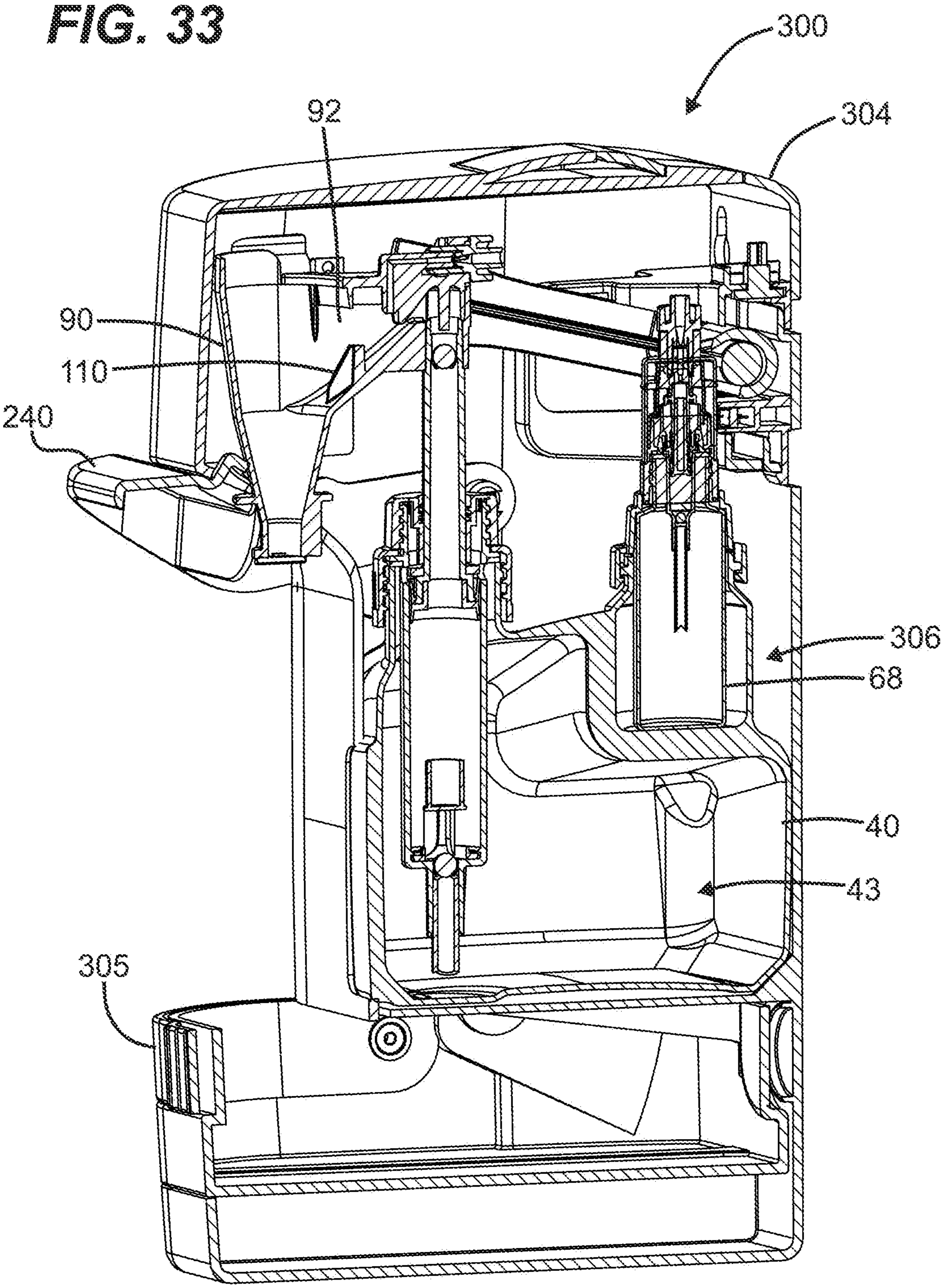
FIG. 33 is a cross-sectional, perspective view of the dispenser of FIG. 31, in a pre-actuated (idle) position.
Figure 34:
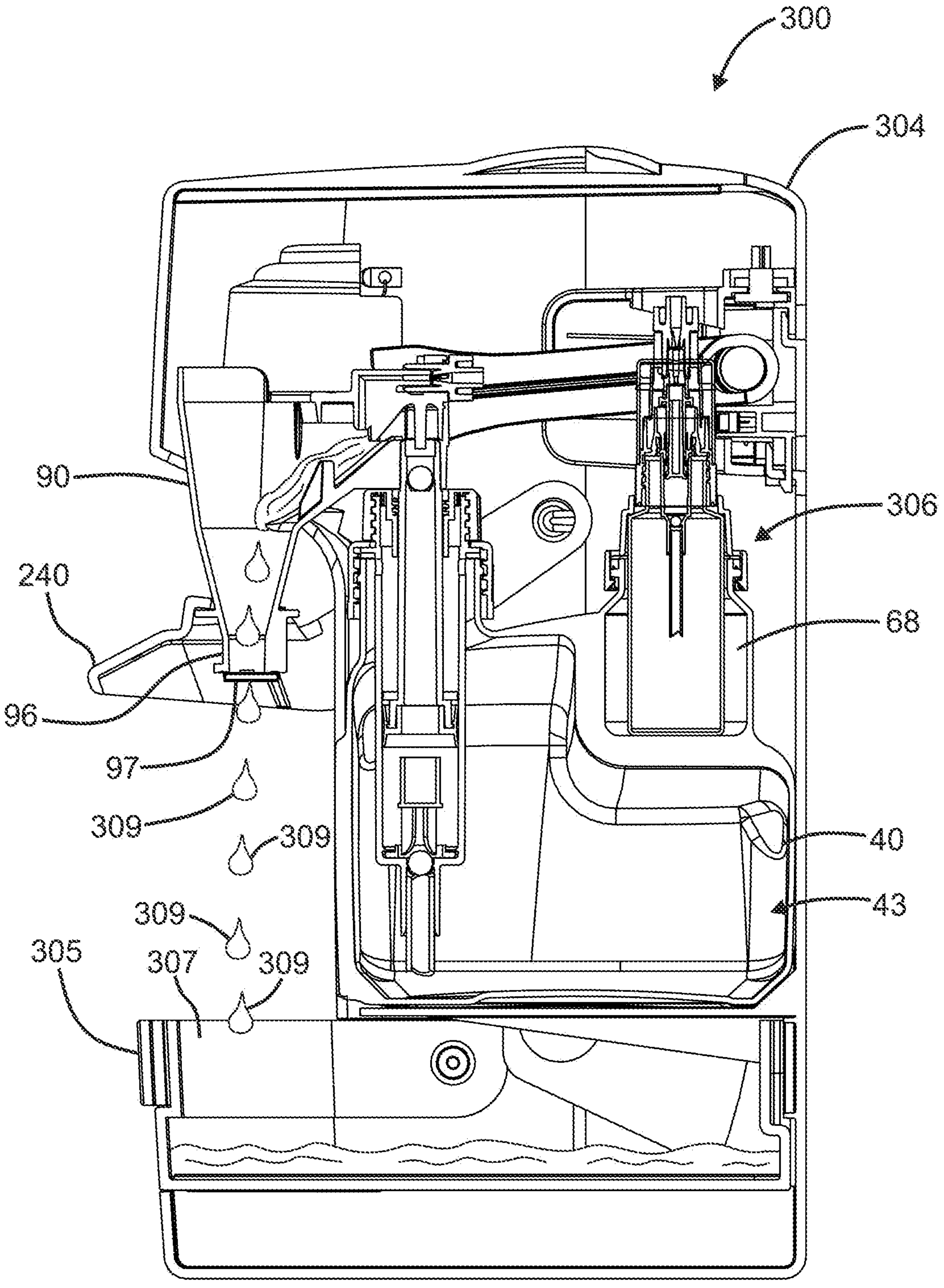
FIG. 34 is a schematic, cross-sectional view of the dispenser of FIG. 32 in the actuated position and showing liquid being dispensed from a funnel arrangement to the tray.

In the example shown, in FIG. 33, the dispenser 304 is shown in the idle, or pre-actuated, state. The push bar 240 can be pushed, to then pull down the funnel arrangement 90 to the actuated state shown in FIG. 32. This action causes liquid to be drawn from the vessel 40 and bottle 68 via the first pump 52 and second pump 70. The liquids are conveyed to the mixing chamber 92, where they are mixed, and then then flow by gravity through the rest of the funnel arrangement 90, through the outlet 97 of the dispenser 96. FIG. 34 shows the mixed liquid 309 falling by gravity from the dispenser 96 into the basin 307 of the catch tray 305. It should be understood that a wipe 38 or towel can be placed directly in the path of the dropping liquid 309, to wet the wipe 38 or towel, with the catch tray 305 positioned to catch any stray drops. Alternatively, the wipe 38 or towel can be dipped into the liquid 309 in the tray 305. Alternatively, the wipe 38 or towel can be pre-positioned in the basin 307 of the tray 305 to soak up the liquid drops 309.

Example methods include the step of applying a force includes pressing down on push bar 240, the push bar 240 being operatively connected to the funnel arrangement 90.

Preferably, the step of actuating the first pump 52 and second pump 70 happens simultaneously.

The step of pulling down the funnel arrangement 90 includes pivoting arm arrangement 122 downwardly against spring 124; the arm arrangement 122 actuating the first pump 52 and second pump 70.

Example methods further include collecting the mixed first liquid and second liquid in the catch tray 305 positioned below the funnel arrangement 90.

Example methods can further include a step of wetting wipe 38 by dipping the wipe 38 in the mixed first liquid and second liquid in the catch tray 305.

The method may further include a step of wetting wipe 38 by placing the wipe 38 in the catch tray 305 to soak up the mixed solution of the first liquid and second liquid.

The method may further include a step of removing the catch tray 305 to carry the mixed first liquid and second liquid to another location.

The above is a description of example principles. Many embodiments can be made using these principles.

What is claimed is:

1. A mixing and dispensing assembly comprising:
(a) a vessel having a surrounding wall defining an interior volume therewithin, and at least a first opening in communication with the interior volume;
(b) a first pump within the first opening and oriented to convey a first liquid stored within the interior volume;
(c) a funnel arrangement in downstream communication with the first pump; the funnel arrangement including:
(i) an upper funnel housing including an open end sized to receive a wipe and a mixing chamber in communication with the first pump;
(ii) a dispensing funnel in communication with the upper funnel housing and downstream of the mixing chamber, wherein the dispensing funnel comprises an outlet end narrower than the open end of the upper funnel housing, and wherein a wipe can be pulled from the upper funnel housing through the dispensing funnel, wetted with the first liquid, and pulled out of the mixing and dispensing assembly through the outlet end; and
(iii) a cap over the open end of the upper funnel housing; the cap including,
(a) a wipe supply opening constructed and arranged to receive a supply of wipes; and
(b) a first port in communication with the first pump and the mixing chamber.

2. The mixing and dispensing assembly of claim 1, wherein upper funnel housing defining the mixing chamber has a sloped wall sloping downwardly away from the first port and toward the dispensing funnel.

3. A dispenser including the mixing and dispensing assembly of claim 1 and:
(a) a housing having a surrounding wall defining an interior volume;
(i) the housing being openable to provide access to the interior volume;
(ii) the housing defining a wipe dispenser opening through the wall sized to permit a treated wipe to be pulled therethrough; and
(b) the mixing and dispensing assembly being removably and replaceably mounted within the interior volume.

4. The dispenser of claim 3, further comprising and an electronic module to detect whether the mixing and dispensing assembly is in place in the housing.

5. The dispenser of claim 4, wherein the electronic module sends a signal when the first pump and a second pump are actuated.

6. The dispenser of claim 3, wherein the housing further includes a backwall and a ledge projecting perpendicular from the backwall into the interior volume of the housing; the ledge having an open gap.

7. The dispenser of claim 6, wherein the vessel and bottle are connected with a fin therebetween; the fin being received within the open gap of the ledge.

8. The mixing and dispensing assembly of claim 1, wherein the dispensing funnel is a separate piece forming a sealed connection with the upper funnel housing.

9. The mixing and dispensing assembly of claim 1, wherein the dispensing funnel is a single unitary molded member with the upper funnel housing.

10. The mixing and dispensing assembly of claim 1, further including a removable wipe threading tool positioned within the funnel arrangement, wherein the removable wipe threading tool comprises a nose with opposing jaws, the opposing jaws defining an elongated slot therebetween.

11. A dispenser comprising:
(a) a vessel having a surrounding wall defining an interior volume therewithin, and at least a first opening in communication with the interior volume;
(b) a first pump within the first opening and oriented to convey a first liquid stored within the interior volume;
(c) a funnel arrangement in downstream communication with the first pump; the funnel arrangement including:
(i) an upper funnel housing including an open end sized to receive a wipe and a mixing chamber in communication with the first pump;
(ii) a dispensing funnel in communication with the upper funnel housing and downstream of the mixing chamber, wherein a wipe can be pulled through the dispensing funnel from the upper funnel housing and wetted with the first liquid; and
(iii) a cap over the open end of the upper funnel housing; the cap including,
(a) a wipe supply opening constructed and arranged to receive a supply of wipes; and
(b) a first port in communication with the first pump and the mixing chamber; and
(d) a housing having a surrounding wall defining a second interior volume;
(i) the housing being openable to provide access to the second interior volume;
(ii) the housing defining a wipe dispenser opening through the wall sized to permit a treated wipe to be pulled therethrough;
(iii) the housing including a backwall and a ledge projecting perpendicular from the backwall into the second interior volume; the ledge having an open gap; the mixing and dispensing assembly being removably and replaceably mounted within the second interior volume, wherein the vessel and a bottle are connected with a fin therebetween; the fin being received within the open gap of the ledge.

12. The dispenser of claim 11, wherein upper funnel housing defining the mixing chamber has a sloped wall sloping downwardly away from the first port and toward the dispensing funnel.

13. A mixing and dispensing assembly comprising:

(a) a vessel having a surrounding wall defining an interior volume therewithin, and at least a first opening in communication with the interior volume;

(b) a first pump within the first opening and oriented to convey a first liquid stored within the interior volume;

(c) a funnel arrangement in downstream communication with the first pump; the funnel arrangement including:

(i) an upper funnel housing including an open end sized to receive a wipe and a mixing chamber in communication with the first pump;

(ii) a dispensing funnel in communication with the upper funnel housing and downstream of the mixing chamber, wherein a wipe can be pulled through the dispensing funnel from the upper funnel housing and wetted with the first liquid; and (iii) a cap over the open end of the upper funnel housing; the cap including, (a) a wipe supply opening constructed and arranged to receive a supply of wipes; and (b) a first port in communication with the first pump and the mixing chamber; and (d) a removable wipe threading tool positioned within the funnel arrangement, wherein the removable wipe threading tool comprises a nose with opposing jaws, the opposing jaws defining an elongated slot therebetween.

14. The mixing and dispensing assembly of claim 13, wherein the dispensing funnel is a separate piece forming a sealed connection with the upper funnel housing.

15. The mixing and dispensing assembly of claim 13, wherein the dispensing funnel is a single unitary molded member with the upper funnel housing.

16. The mixing and dispensing assembly of claim 13, wherein upper funnel housing defining the mixing chamber has a sloped wall sloping downwardly away from the first port and toward the dispensing funnel.

* * * * *